United States Patent
Kofol et al.

(10) Patent No.: US 7,538,727 B2
(45) Date of Patent: May 26, 2009

(54) SYSTEM AND METHOD FOR DETERMINING THE BEARING OF A SOURCE LOCATION FROM A RECEIVER LOCATION

(75) Inventors: John Stephen Kofol, Sunnyvale, CA (US); William R Trutna, Jr., Atherton, CA (US); Graham Flower, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 619 days.

(21) Appl. No.: 11/264,264

(22) Filed: Oct. 31, 2005

(65) Prior Publication Data

US 2007/0099627 A1    May 3, 2007

(51) Int. Cl.
G01S 5/02 (2006.01)
G01S 5/14 (2006.01)
(52) U.S. Cl. .................................. 342/417; 342/357.08
(58) Field of Classification Search ................. 342/417, 342/357.08
See application file for complete search history.

(56) References Cited

U.S. PATENT DOCUMENTS

| | | | | |
|---|---|---|---|---|
| 5,801,389 A | * | 9/1998 | Mizutani et al. | 250/548 |
| 6,535,272 B2 | * | 3/2003 | Ota et al. | 355/53 |
| 2005/0179908 A1 | * | 8/2005 | Wada et al. | 356/496 |
| 2007/0171400 A1 | * | 7/2007 | Payton | 356/73.1 |

* cited by examiner

*Primary Examiner*—Thomas H Tarcza
*Assistant Examiner*—Harry Liu

(57) ABSTRACT

The system comprises a first beatable signal source, a second beatable signal source, a phase reference signal source and a receiver. The first beatable signal source and the second beatable signal source are located at the source location; the receiver is located at the receiver location. The phase reference signal source is operable to generate a phase reference signal. The first beatable signal source is operable to transmit a first beatable signal. The second beatable signal source is spatially offset from the first beatable signal source in a reference direction, and is operable to transmit a second beatable signal differing in frequency from the first beatable signal by a frequency difference. The first beatable signal and the second beatable signal collectively have a phase relationship with the phase reference signal. The receiver is structured to receive the first beatable signal and the second beatable signal and is operable to determine a direction angle, relative to the reference direction, of the source location from the receiver location. The receiver performs operations that comprise measuring a phase difference between a beat signal and either the phase reference signal or an additional beat signal, and determining the direction angle from the measured phase difference. The beat signal obtained by a process involving summing the first beatable signal and the second beatable signal. The additional beat signal is obtained by a process involving summing the first beatable signal and the phase reference signal. The bearing can be determined from the direction angle.

27 Claims, 11 Drawing Sheets

SYSTEM AND METHOD FOR DETERMINING THE BEARING OF A SOURCE LOCATION FROM A RECEIVER LOCATION

BACKGROUND

Communication systems in which the receiver tracks the transmitter typically allow the transmitter to consume less power than the non-tracking communication systems. Consider a satellite system that includes an earth-based receiver and an earth-orbiting transmitting satellite, for example. Currently, such satellite systems include a tracking processor that directs the earth station antenna towards the satellite and/or directs the satellite antenna towards the earth station antenna. Satellites can have simplified hardware if the earth station's antenna is continually steered to face the satellite. Additionally the transmitter in the satellite will consume less power. Lower-power transmitters reduce operational costs. For example, lower power consumption in the satellite transmitter can translate into a decrease in the cost of putting the satellite into orbit if the amount of hardware on the satellite is reduced.

Some bidirectional transceiver systems have multiple transceivers whose relative positions can change. In this case, the receivers of the transceivers in communication exchange positional data and one or both of the receivers readjust the orientations of their antennae for optimal reception.

In an exemplary bidirectional transceiver system, unmanned aerial vehicles (UAVs) are used to provide communication links among the soldiers on a battlefield and between soldiers and a remote command post. The UAVs are equipped with transceivers and other equipment to scout an area, to determine the location of enemy troops and to transmit the enemy's location to the soldiers, who may be moving. The soldiers are equipped with transceivers that communicate, via a UAV, with the command post and other soldiers. To prevent signal interception by the enemy, the UAV transmits sensitive information to the transceiver located on a soldier using a directional signal, rather than with an omni-directional signal. If the UAV uses the more secure directional signal, the transceiver attached to the soldier must update the UAV with the new transceiver location as the soldier moves. It is preferable that the soldier's transceiver does not transmit his or her location to the UAV, since the enemy might intercept the soldier's location signal thereby increasing the danger for the soldier. It is preferable to reduce the weight of the transceivers on the UAV, on the soldier, or on both.

SUMMARY OF THE INVENTION

In a first aspect, the invention provides a system for determining the bearing of a source location from a receiver location. The system comprises a first beatable signal source, a second beatable signal source, a phase reference signal source and a receiver. The phase reference signal source is operable to generate a phase reference signal. The first beatable signal source and the second beatable signal source are located at the source location. The receiver is located at the receiver location. The first beatable signal source is operable to transmit a first beatable signal. The second beatable signal source is spatially offset from the first beatable signal source in a reference direction, and is operable to transmit a second beatable signal differing in frequency from the first beatable signal by a frequency difference. The first beatable signal and the second beatable signal collectively have a phase relationship with the phase reference signal. The receiver is structured to receive the first beatable signal and the second beatable signal and is operable to determine a direction angle, relative to the reference direction, of the source location from the receiver location. The receiver performs operations that comprise measuring a phase difference between a beat signal and either (a) the phase reference signal or (b) an additional beat signal, and determining the direction angle from the measured phase difference. The beat signal is obtained by a process involving summing the first beatable signal and the second beatable signal. The additional beat signal is obtained by a process involving summing the first beatable signal and the phase reference signal. The bearing is determined from the direction angle.

In an embodiment, the phase reference signal source transmits the phase reference signal and the receiver is structured additionally to receive the transmitted phase reference signal.

In another embodiment, the phase reference signal source comprises a source clock and a receiver clock. Each of the source clock and the receiver clock is operable to generate a respective instance of the phase reference signal. The source clock is part of the first beatable signal source. The first beatable signal as transmitted by the first beatable signal source and the second beatable signal as transmitted by the second beatable signal source collectively have a phase relationship with the instance of the phase reference signal generated by the source clock. The receiver clock is part of the receiver and provides the instance of the phase reference signal to the receiver.

Other embodiments of the system comprise additional beatable signal sources spatially offset from the first beatable signal source in respective reference directions to reduce the ambiguity with which the bearing is determined in worlds having two or more dimensions.

In a second aspect, the invention provides a method of determining the bearing, relative to a reference direction, of a first location from a second location. In the method, a first beatable signal transmitted from a first position at the source location and a second beatable signal transmitted from a second position at the source location are received at the receiving location. The first beatable signal has a first frequency. The second beatable signal has a second frequency differing from the first frequency by a frequency difference. The second position is spatially offset from the first position in the reference direction. A direction angle, relative to the reference direction, of the source location from the receiving location is determined from the first beatable signal and the second beatable signal received at the receiving location. Determining the direction angle comprises measuring a phase difference between a beat signal and either a phase reference signal or an additional beat signal, and calculating the direction angle from the measured phase angle. The beat signal is obtained by a process involving summing the first beatable signal and the second beatable signal. The additional beat signal is obtained by a process involving summing the first beatable signal and the phase reference signal. The bearing is then determined from the direction angle.

In a third aspect, the invention provides a system for determining the bearing of a source location from a receiving location. The system comprises a structure for generating a phase reference signal, a structure at the source location for transmitting a first beatable signal and a second beatable signal from locations spatially offset from one another in a reference direction, and a structure at the receiving location for receiving the first beatable signal and the second beatable signal and for determining a direction angle, relative to the reference direction, of the source location from the receiver location. The second beatable signal differs in frequency from the first beatable signal by a frequency difference. The first beatable signal and the second beatable signal collectively have a phase relationship with the phase reference signal. Determining the direction angle involves obtaining a beat signal, measuring a phase difference between the beat signal and one of (a) the phase reference signal, and (b) an additional beat signal, and calculating the direction angle from the phase difference. Obtaining the beat signal comprises summing the first beatable signal and the second beatable signal. Obtaining the additional beat signal comprises summing the first beatable signal and the phase reference signal.

DETAILED DESCRIPTION

Figure 1A:
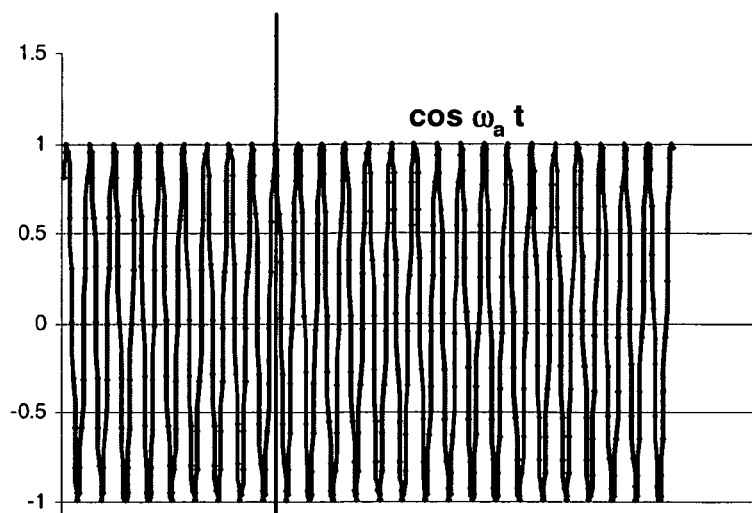
FIGS. 1A, 1B and 1C are graphs showing the variation of electric field with time of single-frequency signals.

The embodiments of the invention described herein are based on the physics of the interference of waves transmitted from spatially separated signal sources. Specifically, the embodiments described herein determine the bearing of a source location from a receiver location by determining one or more direction angles, relative to respective reference directions, of the source location from the receiver location. Two or more beatable signal sources are located at the source location in positions that are spatially offset in each of the reference directions. The beatable signal sources transmit respective beatable signals that differ in frequency. A receiver is located at the receiver location. The receiver determines each direction angle by measuring the phase difference between a beat signal and either a phase reference signal or an additional beat signal. The beat signal obtained by a process that involves summing two of the beatable signals received at the receiver. The additional beat signal, when used, is obtained by a process that involves summing the phase reference signal and one of the beatable signals.

In some embodiments, the phase reference signal is transmitted to the receiver from a phase reference signal source located at the source location. Alternatively, the phase reference signal is supplied by a phase reference signal source that constitutes part of the receiver. In this case, the phase reference signal is not transmitted.

The receiver is supplied with data representing such system parameters as a phase relationship between the beatable signals and the phase reference signal, and a positional relationship between or among the signal sources transmitting the signals. Since the signals propagate from the signal sources located at the source location to the receiver located at the receiver location along propagation paths of different length, summing the beatable signals at the receiver forms a beat signal whose phase depends on the path lengths. The path lengths in turn depend on the bearing. The receiver determines the bearing of the source location from the receiver location with respect to the reference direction in which one of the beatable signal sources is spatially offset relative to another at the source location. The bearing determination is based on the measured phase difference and the system parameters.

In an embodiment in which the phase reference signal source transmits the phase reference signal to the receiver and the phase reference signal source and the first beatable signal source are collocated, the receiver measures the phase difference between the beat signal and the additional beat signal obtained by a process that involves summing the phase reference signal and the first beatable signal.

First, a brief overview of the physics of the interference of waves transmitted from separated signal sources will be provided with reference to FIGS. 1-4. The following description applies to waves of any kind, its references to electromagnetic waves are merely exemplary. This overview will help in understanding the embodiments in accordance with the invention described below with reference to FIGS. 5A, 5B, 6A, 6B, 7A, 7B, 8A, 8B, 9A-9C, 10A-10D and 11. FIGS. 1A-1C illustrate the variation of the electric field with time of an unmodulated electromagnetic signal whose waveform is described by a single cosine term. Such a signal is referred to below as a single-frequency signal. An electromagnetic signal whose waveform is described by a single sine term can also be regarded as a single-frequency signal. FIG. 1A illustrates the variation of electric field with time of an exemplary single-frequency signal with a frequency of $\omega_a$. FIG. 1B illustrates the variation of the electric field with time of an electromagnetic single-frequency signal with a frequency of $\omega_b$, different from $\omega_a$. FIG. 1C illustrates the variation of electric field with time of an exemplary single-frequency signal with the frequency of $\omega_b$ and having a phase difference $\psi$ from the signal shown in FIG. 1B. As used herein, the word frequency refers to angular frequency, as known in the art.

Figure 1B:
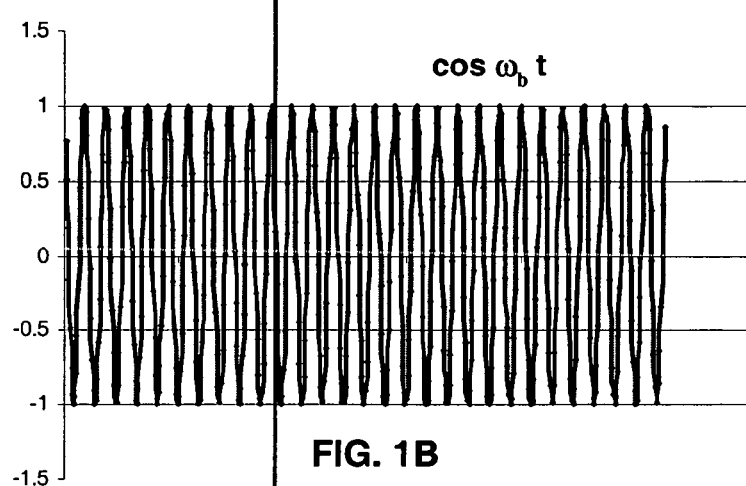
Figure 2A:
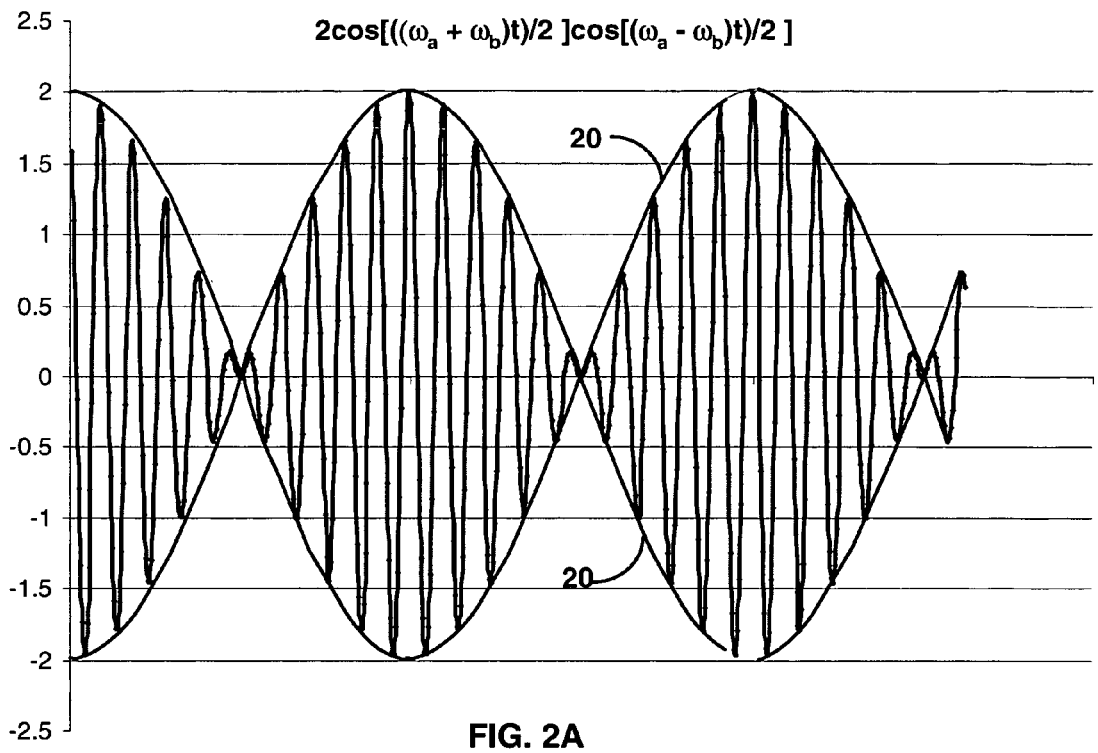
FIGS. 2A and 2B are graphs showing the variation of electric field with time of the sum signals obtained by summing the single-frequency signal shown in FIG. 1A with the single-frequency signal shown in FIG. 1B and the single-frequency signal shown in FIG. 1C, respectively.

FIG. 2A illustrates the variation of electric field with time of the sum signal that results when the single-frequency signals shown in FIGS. 1A and 1B are summed. In this example, $\omega_b/\omega_a=1.1$. The electric field shown in FIG. 2A is described mathematically as:

$$\cos(\omega_a t)+\cos(\omega_b t)=2\cos[((\omega_a+\omega_b)t)/2]\cos[((\omega_a-\omega_b)t)/2]. \quad (1)$$

The second cosine factor on the right-hand side of equation (1) represents the beat signal component of the sum signal obtained by summing the single-frequency signals shown in FIG. 1A and FIG. 1B. The beat signal component has a periodic amplitude envelope 20 whose frequency is $(\omega_a-\omega_b)/2$. This frequency will be referred to as a beat frequency.

Figure 1C:
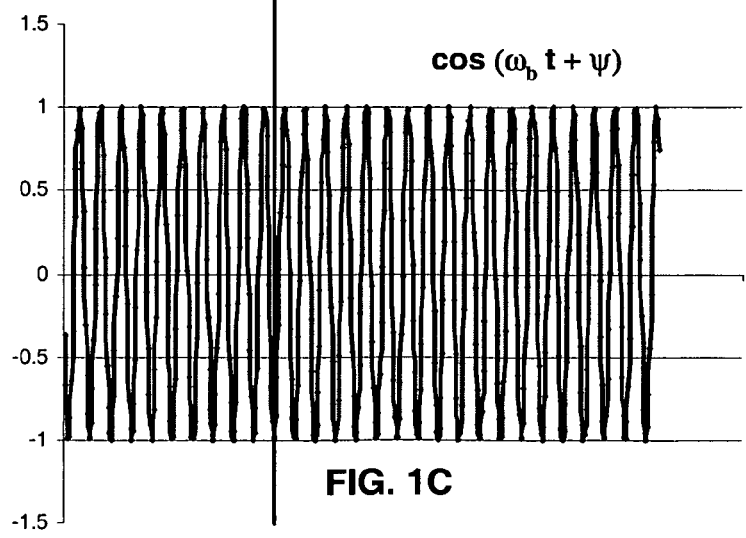
Figure 2B:
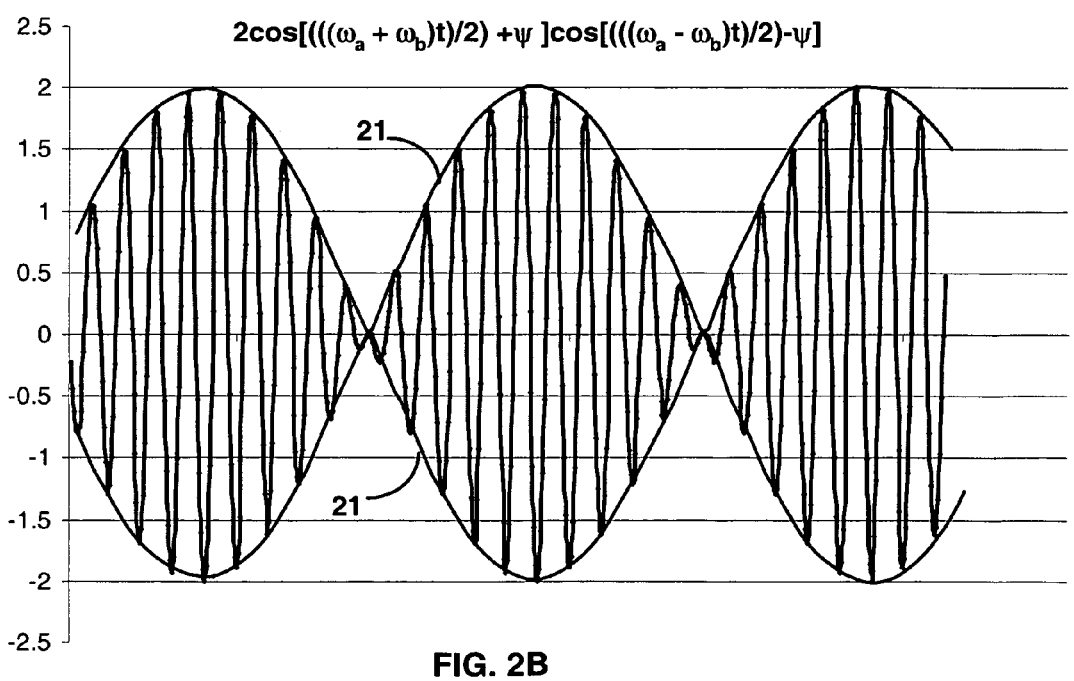

FIG. 2B illustrates the variation of electric field with time of the sum signal that results when the single-frequency signals shown in FIGS. 1A and 1C are summed. In example shown, $(\omega_b/\omega_a=1.1$ and $\psi=0.4\pi$. The electric field shown in FIG. 2B is described mathematically as:

$$\cos(\omega_a t)+\cos(\omega_b t+\psi)=2\cos[(((\omega_a+\omega_b)t)/2)+\psi]\cos[(((\omega_a-\omega_b)t)/2)-\psi]. \quad (2)$$

The second cosine factor on the right hand side of equation (2) represents the beat signal component of the sum signal obtained by summing the single-frequency signals shown in FIG. 1A and FIG. 1C. The beat signal component has a periodic amplitude envelope 21 whose frequency is $(\omega_a-\omega_b)/2$, i.e., the same frequency as that of periodic amplitude envelope 20 shown in FIG. 2A. However, periodic amplitude envelope 21 differs in phase from periodic amplitude envelope 20 due to the phase difference $\psi$ between the single-frequency signals shown in FIGS. 1B and 1C.

Figure 3:
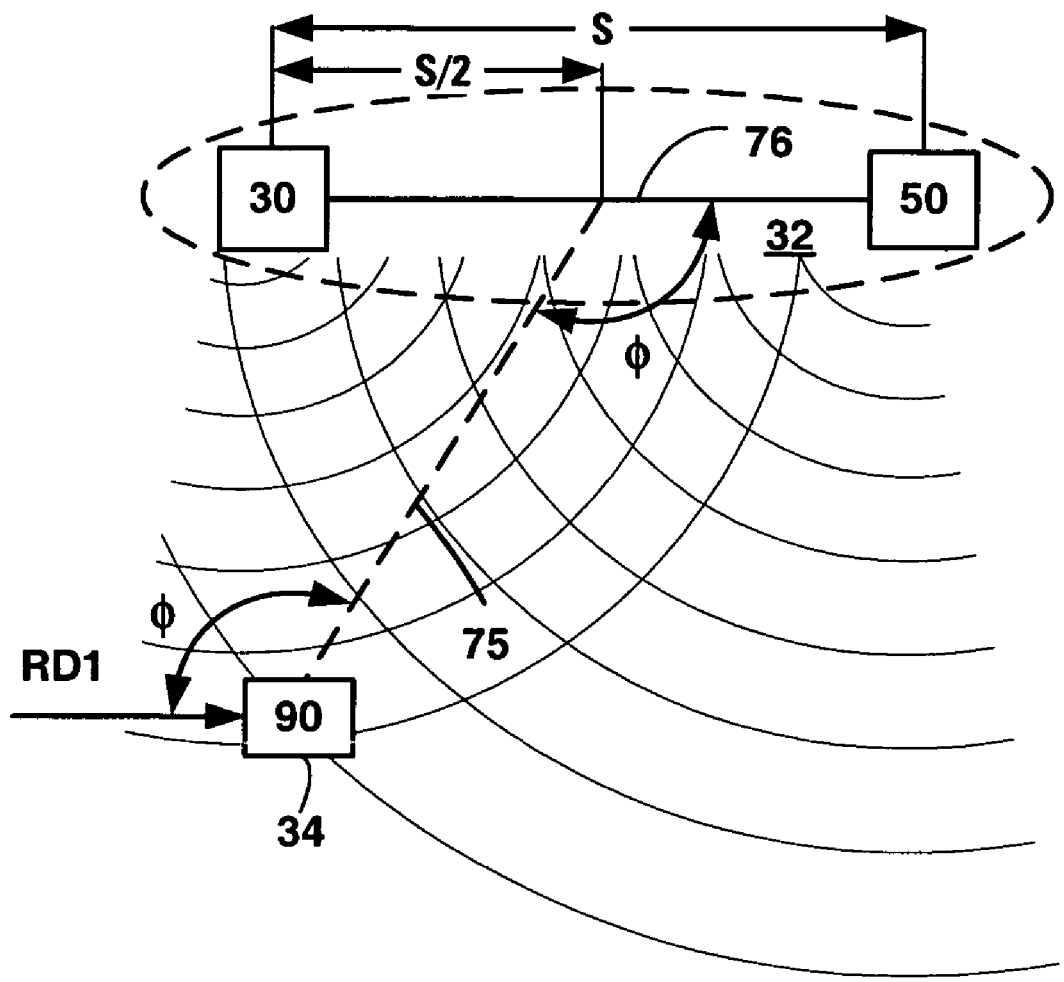
FIG. 3 is a schematic drawing showing a system in which single-frequency signals transmitted from two sources are incident on a receiver.

FIG. 3 illustrates a system in which single-frequency signals respectively transmitted from two beatable signal sources at a source location 32 are incident on a receiver 90 at a receiver location 34. First beatable signal source 30 transmits a single-frequency signal $\cos(\omega_a t)$, for example, and second beatable signal source 50 transmits a single-frequency signal $\cos(\omega_b t)$, for example. In another embodiment, first beatable signal source 30 transmits single-frequency signal $\cos(\omega_a t)$ and second beatable signal source 50 transmits a single-frequency signal $\cos(\omega_b t+\Psi)$.

At source location 32, second beatable signal source 50 is spatially offset from first beatable signal source 30 by a distance S in a first reference direction RD1. The spatial offset between first beatable signal source 30 and second beatable signal source 50 is a first spatial offset and is represented by a line 76. All the signal sources illustrated herein are essentially point sources and the indicated spatial offset between one of the beatable signal sources and another of the beatable signal sources is the distance between the point sources. At source location 32, the mid-way point between the first beatable signal source 30 and the second beatable signal source 50 is spatially offset from receiver 90 in a direction having a bearing $\phi$ relative to first reference direction RD1. The spatial offset of the mid point between first beatable signal source 30 and second beatable signal source 50 from receiver 90 is a second spatial offset and is represented by a line 75 angled at bearing $\phi$ relative to the first reference direction RD1.

Receiver 90 receives the beatable signals from first beatable signal source 30 and second beatable signal source 50 and sums them to form a sum signal having a beat signal component. In an example (not shown) in which first beatable signal source 30 and second beatable signal source 50 are collocated, the beat signal component has an envelope similar to envelope 20 shown in FIG. 2A or envelope 22 shown in FIG. 2B, depending on whether a phase difference exists between the beatable signals transmitted by first beatable signal source 30 and second beatable signal source 50. In the example shown in FIG. 3, second beatable signal source 50 is spatially offset from first beatable signal source 30 by the first spatial offset represented by line 76, as noted above, and the path of the first beatable signal from first beatable signal source 30 to receiver 90 differs in length from the path of the second beatable signal from second beatable signal source 50 to receiver 90. Thus, at receiver 90, the phase difference between the beatable signals received from first beatable signal source 30 and second beatable signal source 50 is different from that in the above-described example in which the first beatable signal source and the second beatable signal source are collocated. Hence, the beat signal component of the sum signal obtained in the example shown in FIG. 3 differs in phase from the beat signal component of the sum signal obtained when the beatable signal sources are collocated.

In an example in which the beatable signal transmitted by first beatable signal source 30 is a single-frequency signal having a frequency of $\omega_a$ (FIG. 1A), the beatable signal transmitted by second beatable signal source 50 is a single-frequency signal having a frequency of $\omega_b$ (FIG. 1B), and second beatable signal source 50 is spatially offset from first beatable signal source 30 as shown in FIG. 3, the envelope of the beat signal component of the sum signal obtained at receiver 90 differs in phase from envelope 20 shown in FIG. 2A by a phase difference that depends on the difference in phase and frequency between the second beatable signal transmitted by second beatable signal source 50 and the first beatable signal transmitted by first beatable signal source 30, the distance S between second beatable signal source 50 and first beatable signal source 30, and the bearing $\phi$ from receiver 90 of the mid-point between first beatable signal source 30 and the second beatable signal source 50. The bearing $\phi$ is relative to first reference direction RD1.

Receiver 90 is a phase-sensitive receiver. A phase sensitive receiver will generate a beat signal when it receives two signals that differ in frequency but that have frequencies within the passband of the receiver. In an example, receiver 90 detects the beat signal resulting from summing the first beatable signal and the second beatable signal by summing the first beatable signal and the second beatable signals to form a sum signal and then subjecting the sum signal to demodulation to extract the beat signal component from the sum signal as the beat signal. The detection process produces a beat signal, examples of which are described below with reference to FIGS. 4A and 4B, having the same phase properties as the envelope of the beat signal component of the sum signal. The beat signal preserves the phase of the beat signal component. However, neither the beat signal component nor the beat signal provides an absolute indication of phase.

Figure 4A:
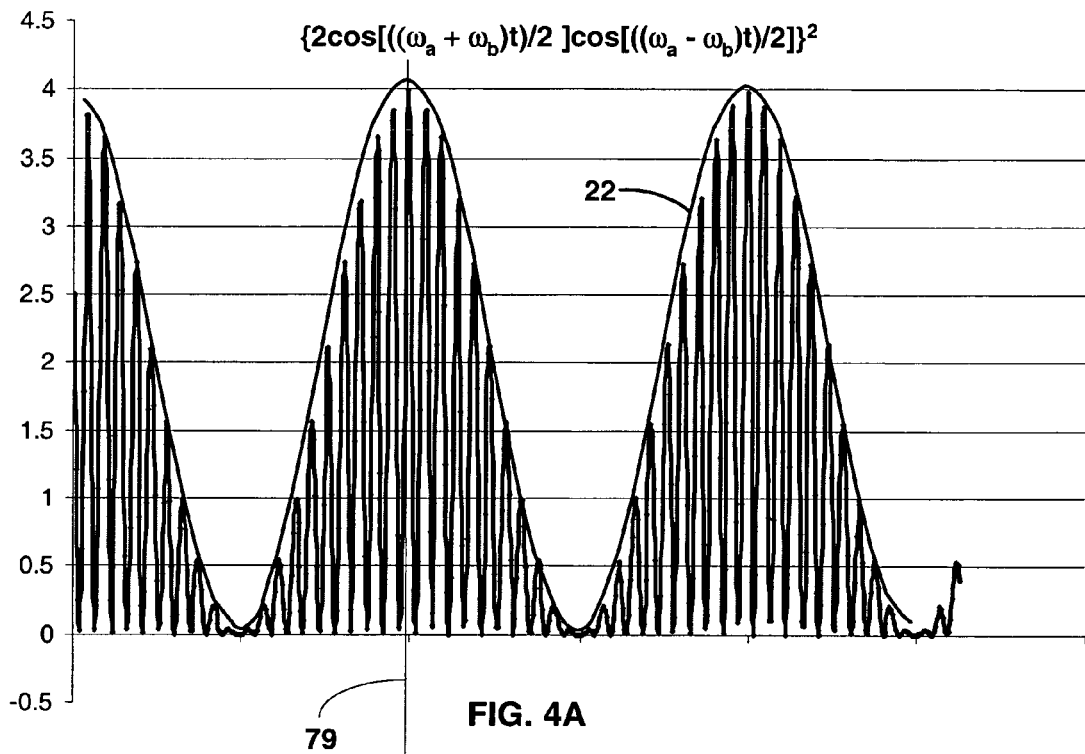
FIGS. 4A and 4B are graphs showing the signals shown in FIGS. 2A and 2B, respectively, after processing by the phase-sensitive receiver shown in FIG. 3.
Figure 4B:
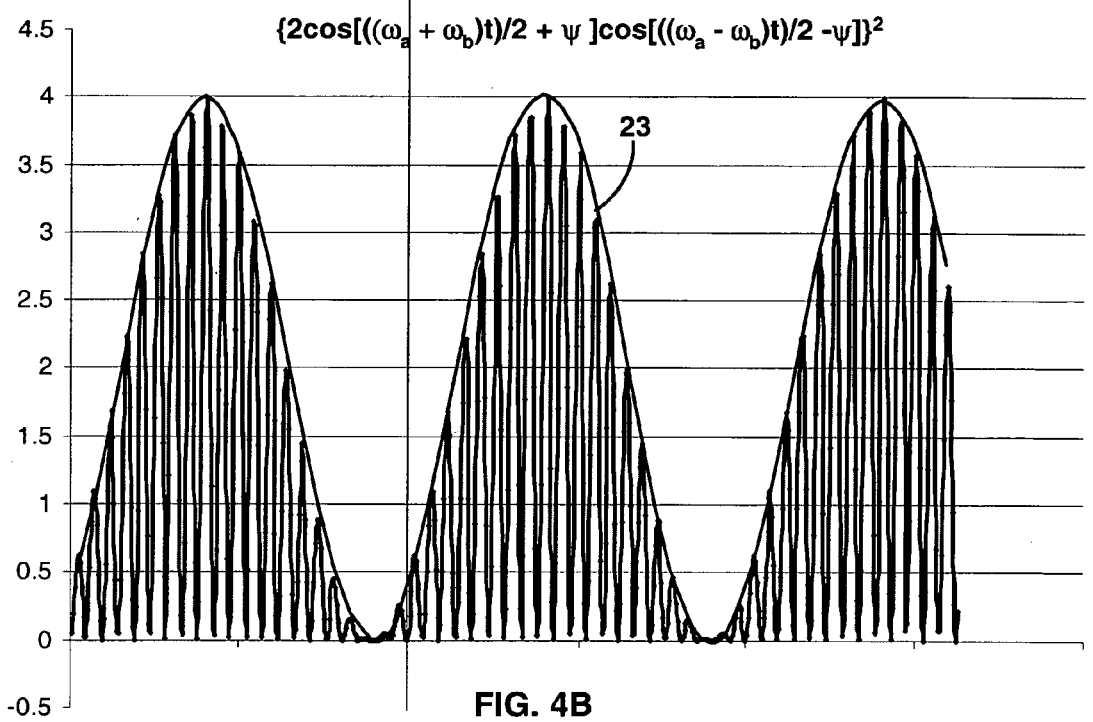

FIGS. 4A and 4B are graphs showing the variation of the electric fields with time of the signal that results when the sum signals whose electric fields are shown in FIGS. 2A and 2B, respectively, are subject to a squaring operation, i.e., the sum signal is multiplied by itself. In the examples shown in FIGS. 4A and 4B, first beatable signal source 30 and second beatable signal source 50 are collocated. The squared signal shown in FIG. 4A has an envelope 22 and the squared signal shown in FIG. 4B has an envelope 23. Envelope 22 is identical in frequency and phase to envelope 20 of the sum signal shown in FIG. 2A. Envelope 23 is identical in frequency and phase to the envelope 21 of the sum signal shown in FIG. 2B.

Envelope 22 is described mathematically as:

$$\{2 \cos [((\omega_a+\omega_b)t)/2] \cos [((\omega_a-\omega_b)t)/2]\}^2 \quad (3).$$

Envelope 23 is described mathematically as:

$$\{2 \cos [(((\omega_a+\omega_b)t)/2)+\psi] \cos [(((\omega_a-\omega_b)t)/2)-\psi]\}^2 \quad (4).$$

Envelope 23 differs in phase from envelope 22. In example shown, when envelope 22 is at its peak amplitude, envelope 23 is just past its minimum amplitude due to the phase difference $\psi$ of $0.4\pi$ indicated by line 79. In the example shown in FIG. 3 in which second beatable signal source 50 is spatially offset from first beatable signal source 30, the envelope of the beat signal (not shown) differs further in phase from envelope 22 or envelope 23 due to the additional phase difference introduced by the different path lengths from beatable signal sources 30 and 50 to receiver 90. However, in the example shown in FIG. 3, receiver 90 is incapable of quantifying this additional phase difference at any arbitrary position of receiver 90.

The squared signals shown in FIGS. 4A and 4B are signals generated in embodiments receiver 90 performing an exemplary demodulation process that extracts the respective beat signals from the sum signals shown in FIGS. 2A and 2B, respectively. After performing the squaring process illustrated above, receiver 90 subjects the squared signals to low-pass filtering that rejects the frequency component having the sum frequency $(\omega_a+\omega_b)/2$ but that passes the frequency component having the difference frequency $(\omega_a-\omega_b)/2$, i.e., the beat frequency component. The signal passed by the low-pass filter has a large DC component, as can be seen from FIGS. 4A and 4B. Receiver 90 discards the DC component by AC coupling the output of the low-pass filter, which then provides the desired beat signal. The receiver embodiments described below may use a similar process to demodulate the beat signal from the sum signal. Other demodulation techniques suitable for extracting the beat signal from the sum signal are known in the art and may alternatively be used.

FIGS. 5A, 6A, 7A, 8A, 9A, 10A, 10B and 11 schematically show a bearing-determining system for determining the bearing of a source location from a receiving location in accordance with respective embodiments of the invention. Each of the embodiments includes two or more beatable signal sources at source location 32 and a phase-sensitive receiver at receiver location 34. The beatable signal sources are similar to those described above with reference to FIG. 3. A phase-sensitive receiver similar to phase-sensitive receiver 90 described above with reference to FIG. 3 constitutes part of the phase-sensitive receiver of the embodiments shown in FIGS. 5A, 6A, 7A, 8A, 9A, 10A, 10B and 11.

Each of the embodiments shown in FIGS. 5A, 6A, 7A, 8A, 9A, 10A, 10B and 11 additionally includes a phase reference signal source that generates a phase reference signal. The phase reference signal allows the phase sensitive receiver to measure the phase shift of the beat signal and, from the measured phase shift, to calculate one or more direction angles, each relative to a respective reference direction, of source location 32 from the receiver location 34. The receiver then determines the bearing of the source location from the one or more direction angles. Some of the embodiments determine only a single direction angle. A single direction angle does not always allow the bearing to be unambiguously determined.

Each of FIGS. 5B, 6B, 7B, 8B, 9B, 9C, 10C and 10D schematically shows the spectrum of the two or more beatable signals and the phase reference signal in respective embodiments.

As used herein, a phase reference signal is a signal generated by the phase reference signal source of a bearing-determining system in accordance with an embodiment of the invention. The phase reference signal is not necessarily a single-frequency signal.

A beatable signal is a signal transmitted from a beatable signal source located at the source location of a bearing-determining system in accordance with an embodiment of the invention. A beatable signal is a single-frequency signal.

Several embodiments of the bearing-determining system will now be described.

The bearing-determining system has at least two spatially-offset beatable signal sources at source location 32 and a phase-sensitive receiver at receiver location 34. The phase-sensitive receiver measures the phase difference between a beat signal and either a phase reference signal or an additional beat signal. The beat signal is obtained by a process in which the beatable signals transmitted by two of the spatially-separated beatable signal sources are summed at the receiver, and the resulting sum signal is demodulated to extract the beat signal. The beatable signals travel from the beatable signal sources to the receiver via propagation paths that are typically of unequal length, so the beat signal has a bearing-dependent phase. In some embodiments, the phase reference signal is additionally transmitted to the receiver from a phase reference signal source located at the source location. In other embodiments, the phase reference signal source is composed of a source clock located at the source location and a receiver clock that constitutes part of the receiver. The phase reference signal is not transmitted in such embodiments. In embodiments in which the first beatable signal source and the phase reference signal source are collocated, the additional beat signal is obtained by summing the phase reference signal and the first beatable signal and demodulating the resulting sum signal to extract the additional beat signal.

The receiver then processes the measured phase difference to determine the direction angle, relative to the reference direction, of the source location from the receiver location. The receiver then determines the bearing of the source location from the direction angle.

As will be described in more detail below, with only two beatable signal sources located at source location 32, the bearing determined by the phase-sensitive receiver is unambiguous in a one-dimensional world (i.e., a world in which the receiver location can be anywhere substantially along a straight line), but is ambiguous in both a two-dimensional world (i.e., a world in which the receiver location can be anywhere substantially in the plane in which the source location is also located) and a three-dimensional world (i.e., a world in which the receiver location can be anywhere in a volume in which the source location is also located). Three or more beatable signal sources spatially offset in two, non-parallel directions allow the receiver to determine the bearing unambiguously in the one- and two-dimensional worlds, but the determination remains ambiguous in the three-dimensional world. Four or more beatable signal sources spatially offset in three, non-coplanar directions, allow the receiver to determine the bearing unambiguously in the one-, two- and three-dimensional worlds. As an alternative to providing additional beatable signal sources, constraints placed on the relationship between the receiver location and the source location can eliminate the ambiguity with which the bearing is determined.

The receiver is provided with information indicating the phase relationship between the beatable signals as transmitted and the phase reference signal, the positional relationship between or among the signal sources at the source location, and other system conditions. Each beatable signal propagates along a respective signal path extending from the respective beatable signal source to the receiver. The beatable signals are received at the receiver. The receiver sums the beatable signal to form a sum signal that includes a beat signal component, and demodulates the sum signal to extract the beat signal component as a beat signal. The phase of the beat signal depends on the difference in the respective path lengths between the beatable signal sources and the receiver. The phase of the beat signal additionally depends on other system conditions, as will be described below. The receiver measures the phase difference between the beat signal and either the phase reference signal or an additional beat signal obtained by summing the first beatable signal and the phase reference signal. The receiver processes the measured phase difference to calculate the direction angle of the source location from the receiver location relative to a reference direction, which is the direction of the spatial offset between the beatable signal sources. The receiver then determines the bearing of the source location from the direction angle. The mathematics used to determine the direction angle of the phase reference signal source will described below for the first embodiment of system 10 shown in FIG. 5A.

To allow the phase-sensitive receiver to determine the bearing of the source location from the receiver location, the following conditions should exist: the distances between the beatable signal sources and the phase reference signal source at the source location are small compared with the distance between the receiver location and the source location; each beatable signal is a single-frequency signal; the phase relationship between the beatable signals constituting a pair of beatable signals system is constant; the frequency difference between the beatable signals constituting a pair of beatable signals is small compared with the frequencies of the beatable signals themselves and is constant; the distance between the beatable signal sources is small compared with the mean wavelength of the respective beatable signals; and the various signals propagate from the respective signal sources to the receiver at a constant velocity and are undeflected by intermediate objects. In an example in which the signals are electromagnetic signals, the constant velocity is the speed of light divided by the index of refraction of material between the source location and the receiver location. In an example in which the signals are acoustic signals, e.g., under water, the constant velocity is the speed of sound divided by the acoustic index of refraction of material between the source location and the receiver location.

To determine the bearing of the source location from the receiver location, data is stored at the receiver representing the values of such parameters as: the frequency of each beatable signal; the positional relationship between or among the signal sources at the source location, i.e., the beatable signal sources and, in embodiments in which the phase reference signal is transmitted, the phase reference signal source; the phase relationship between the beatable signals as transmitted by the respective beatable signal sources and the phase reference signal; the frequency of the phase reference signal; the phase of the phase reference signal; the frequency and phase of any carrier signal, where applicable, modulated by the phase reference signal; and receiver-induced phase delay. The above-described positional relationship is quantified by spatial offsets between one of the beatable signal sources and each of the remaining beatable signal sources and a spatial offset between the one of the beatable signal sources and each of the phase reference signal sources that transmits a phase reference signal. Each spatial offset is composed of a distance and a direction. The data is stored, for example, in a memory that constitutes part of a processor that in turn constitutes part of the phase-sensitive receiver.

Figure 5A:
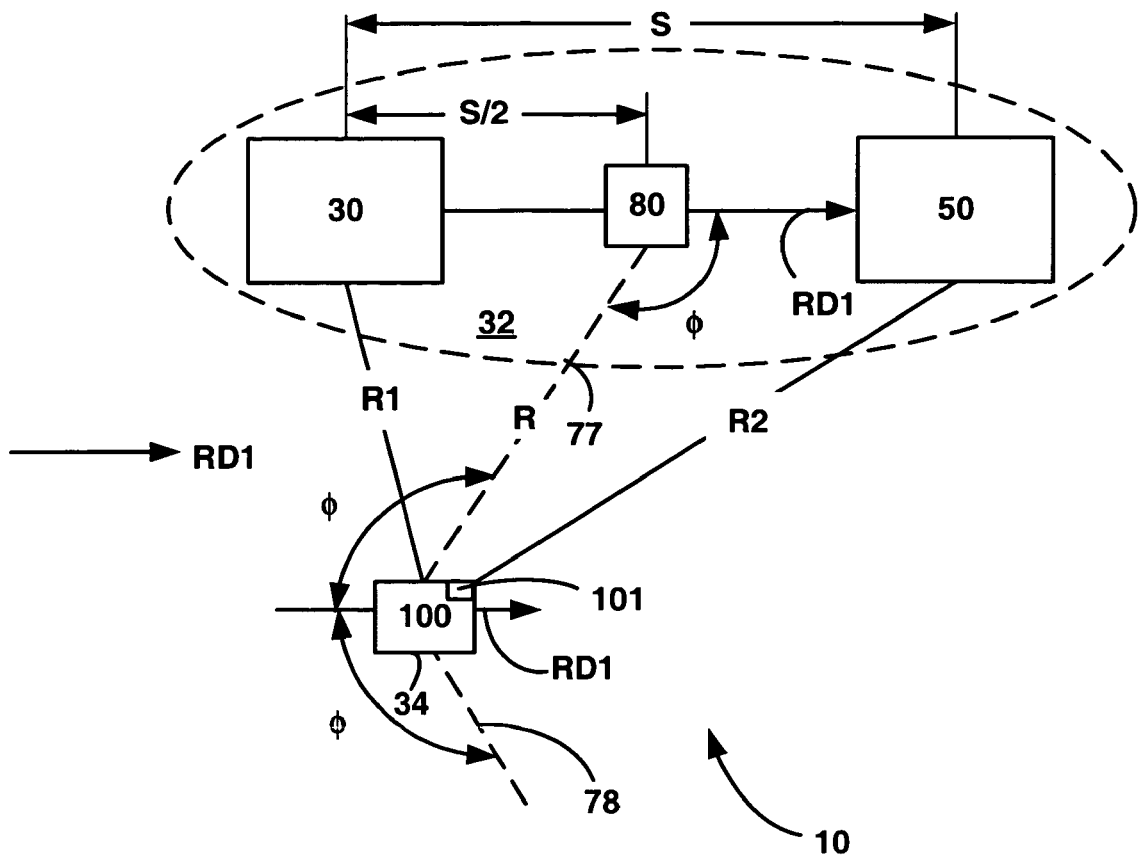
FIG. 5A is a schematic drawing showing a system for determining the bearing of a source location from a receiver location in accordance with a first embodiment of the invention.

FIG. 5A is a schematic drawing showing a system 10 for determining the bearing of a source location from a receiver location in accordance with a first embodiment of the invention. In the example shown, the bearing of a phase reference signal source is determined as the bearing of the source location. As a result of the conditions set forth above, the size of the source location is sufficiently small that the bearing of the phase reference signal source can be regarded as being the bearing of the entire source location. In system 10, the receiver located at the receiver location receives two beatable signals and a phase reference signal transmitted from the source location and measures the phase difference between the phase reference signal and a beat signal formed in part by summing the two beatable signals. In the example shown in FIG. 5A, the phase reference signal source transmits the phase reference signal in the form of a modulated signal obtained by modulating the amplitude of a carrier signal (not shown) with the phase reference signal. The receiver receives the modulated signal and subjects the modulated signal to AM demodulation to recover the phase reference signal.

System 10 includes a first beatable signal source 30, a second beatable signal source 50 and a phase reference signal source 80 located at a source location 32, and a phase-sensitive receiver 100 located at a receiver location 34. At source location 32, first beatable signal source 30 is located at a first position; second beatable signal source 50 is located at a second position spatially offset from the first position by a distance S in a first reference direction RD1; and phase reference signal source 80 is located between the first position and the second position. The distance of second beatable signal source 50 from first beatable signal source 30 is designed as S. Phase reference signal source 80 is spatially offset from first beatable signal source 30 in first reference direction RD1. In the example shown in FIG. 5A, phase reference signal source 80 is located midway between first beatable signal source 30 and second beatable signal source 50 and so is spatially offset from first beatable signal source 30 by the distance S/2.

First beatable signal source 30, second beatable signal source 50, and phase reference signal source 80 have a positional relationship quantified by distances S and S/2 and first reference direction RD1. Data representing the positional relationship is provided to receiver 100, where it is stored in processor 101.

Receiver location 34 is spatially offset from first beatable signal source 30 by a distance R1 and is spatially offset from second beatable signal source by a distance R2. The receiver location is spatially offset from phase reference signal source 80 by the distance R in a direction angled at a direction angle $\phi$ relative to first reference direction RD1. The direction angle $\phi$ of phase reference signal source 80 from receiver 100 relative to the reference direction RD1 is also the bearing of the phase reference signal source from the receiver.

Receiver 100 comprises circuitry (not shown) that provides conventional receiver functions including selectively receiving signals in accordance with the respective frequencies of the signals, and with respect to some of the received signals, summing pairs of such signals to form respective sum signals and demodulating each sum signal to provide a respective beat signal. An exemplary demodulation scheme capable of extracting the beat signal is described above with reference to FIG. 3. The frequency difference between two signals that are summed is typically small compared with the frequencies of the signals themselves. This allows the receiver to receive both signals using the same channel. Receiving the signals this way automatically sums the signals so that no additional summing circuitry is needed. In embodiments in which one signal is summed with two other signals, channels that encompass each pair of the signals can be used. The pass bands of both channels overlap the frequency of the one signal.

In some embodiments, especially those in which the frequency of the phase reference signal is low, and is therefore difficult to transmit with a transmitter with small physical size, a carrier signal having a frequency more suitable for transmission is modulated with the phase reference to produce a modulated signal. For example, the amplitude of the carrier signal can be modulated to provide the modulated signal. With respect to a phase reference signal that receiver 100 receives as a modulated signal, receiver 100 includes circuitry that demodulates the modulation of such modulated signal to recover the phase reference signal. For example, in embodiments in which the modulated signal is an amplitude-modulated (AM) signal, receiver 100 includes an AM demodulator.

Receiver 100 additionally includes circuitry that measures a respective phase difference between the above-described beat signal and the phase reference signal or an additional beat signal. Circuitry and techniques for performing such functions are known in the art and will not be described here.

Finally, receiver 100 includes a processor 101 that controls the operation of the receiver and additionally processes the one or more phase differences measured by the receiver to determine respective direction angles, and to determine the bearing of the source location from the one or more direction angles, as will be described below. Processor 101 includes memory (not shown) that is used in conjunction with the processing performed by the processor and for storing various data relating to system 10.

As used in this disclosure, a harmonic of a fundamental frequency $f_0$ is any one frequency rationally related to the fundamental frequency $f_0$, i.e., a frequency that can be expressed as $mf_0/n$, where m and n are both integers. Examples of rationally-related frequencies include the fundamental frequency $f_0$ itself (the first harmonic of the fundamental), an integer multiple of the fundamental frequency, i.e., $mf_0$ (a second or higher harmonic of the fundamental), and an integer fraction of the fundamental frequency, i.e., $f_0/n$ (a sub-harmonic of the fundamental).

Figure 5B:
FIG. 5B is a schematic drawing showing the spectrum of the signals in the system shown in FIG. 5A in accordance with a second embodiment of the invention.

FIG. 5B is a schematic drawing showing the spectrum of the signals in an example of system 10 shown in FIG. 5A. First beatable signal source 30 transmits a first beatable signal having a first frequency $\omega_1$. Second beatable signal source 50 transmits a second beatable signal having a second frequency $\omega_2$. Phase reference signal source 80 transmits a phase reference signal having a phase reference frequency $\omega_{TS}$ equal to a harmonic of the frequency difference $\Delta\omega$ between the first frequency $\omega_1$ and the second frequency $\omega_2$. In the example shown, the frequency $\omega_{TS}$ of the phase reference signal is one-half the frequency difference $\Delta\omega$, i.e., $\omega_{TS}=\Delta\omega/2$. In this example, the frequency $\omega_{TS}$ of the phase reference signal is equal to the frequency of the beat signal extracted from the sum signal generated by summing the first beatable signal and the second beatable signal.

In this first embodiment, the phase reference signal is a square wave or a cosine wave. Phase reference signal source 80 transmits the phase reference signal as a modulated signal obtained by modulating the amplitude of a carrier signal (not shown) with the phase reference signal. In one example in which the phase reference signal is a square wave, the minimum amplitude of the modulated signal is zero, i.e., the carrier signal is 100% modulated by the phase reference signal. In another example, the minimum amplitude of the carrier signal is greater than zero but is less than the maximum amplitude, i.e., the carrier signal is less than 100% modulated by the phase reference signal. Various methods for modulating the amplitude of a carrier signal with the phase reference signal are known in the art and will therefore not be described here. Data indicating the way in which the carrier signal is modulated with the phase reference signal is provided to receiver 100, where it is stored in processor 101.

At source location 32, the first beatable signal transmitted by first beatable signal source 30 and the second beatable signal transmitted by second beatable signal source 50 collectively have a phase relationship with the phase reference signal transmitted by phase reference signal source 80. The phase relationship will be described in more detail below. Data representing the phase relationship is provided to receiver 100, where it stored in processor 101.

In system 10, receiver 100 determines the direction angle $\phi$ of phase reference signal source 80 relative to reference direction RD1 as follows. The receiver receives the first beatable signal, the second beatable signal and the modulated signal that includes the phase reference signal. The receiver sums the first beatable signal and the second beatable signal and demodulates the sum signal to extract the beat signal having a frequency $\Delta\omega/2$ equal to one-half of the frequency difference $\Delta\omega=(\omega_1-\omega_2)$ between the first frequency $\omega_1$ of the first beatable signal and the second frequency $\omega_2$ of the second beatable signal. The receiver subjects the modulated signal to AM demodulation to recover the phase reference signal, which is harmonically related to the beat signal. In this embodiment, the beat signal and the phase reference signal are equal in frequency. The receiver measures the phase difference $\Delta\Phi$ between the beat signal and the phase reference signal. Processor 101 processes the measured phase difference $\Delta\Phi$ to determine the direction angle $\phi$ of source location 32 relative to the first reference direction RD1. The determination is based in part on the phase relationship and the positional relationship. The receiver additionally determines the bearing of source location 32 relative to the first reference direction RD1 from the direction angle.

The mathematics used to calculate the direction angle $\phi$ of source location 32 (specifically that of phase reference signal source 80) from receiver location 34 in system 10 will now be described. As noted above, the mathematics may be adapted to calculate the specific direction angle of either or both of first beatable signal source 30 and second beatable signal source 50 in addition to or instead of that of phase reference signal source 80.

The first beatable signal {BS1} transmitted by first beatable signal source 30 can be described as:

$$\{BS1\} = A_0 \cos(\omega_1 t + \theta_1)$$

where $A_0$ is the amplitude of the first beatable signal at first beatable signal source 30, $\omega_1$ is the frequency of the first beatable signal, $\theta_1$ is the phase of the first beatable signal as transmitted by first beatable signal source 30 and t is time. The equation for {BS1} represents a single-frequency cosinusoidal signal in this example.

The second beatable signal {BS2} transmitted by second beatable signal source 50 can be described as:

$$\{BS2\} = B_0 \cos(\omega_2 t + \theta_2)$$

where $B_0$ is the amplitude of the second beatable signal at second beatable signal source 50, $\omega_2$ is the frequency of the second beatable signal and $\theta_2$ is the phase of the second beatable signal as transmitted by second beatable signal source 50. The equation for rec{BS2} represents a single-frequency cosinusoidal signal in this example.

At receiver location 34, receiver 100 receives the first beatable signal from beatable signal source 30 at source location 32 as:

$$\text{rec}\{BS1\} = A \cos\{(t - R_1/v)\omega_1 + \theta_1\} \quad (5)$$

where A is the amplitude of the first beatable signal at receiver 100.

Receiver 100 additionally receives the second beatable signal from beatable signal source 50 at source location 32 as:

$$\text{rec}\{BS2\} = B \cos\{(t - R_2/v)\omega_2 + \theta_2\} \quad (6)$$

where B is the amplitude of the second beatable signal at receiver 100.

Receiver 100 sums received beatable signals rec{BS1} and rec{BS2} to produce a sum signal SS{A+B}:

$$SS\{A+B\} = A \cos\{(t - R_1/v)\omega_1 + \theta_1\} + B \cos\{(t - R_2/v)\omega_2 + \theta_2\} \quad (7)$$

Next, receiver 100 demodulates the sum signal SS{A+B} to extract beat signal BS{A+B}:

$$BS\{A+B\} = G \cos[\{(\omega_1 - \omega_2)t + (-\omega_1 R_1 + \omega_2 R_2)/v + (\theta_1 - \theta_2)\}/2] \quad (8)$$

The result shown depends upon the assumption that $|\omega_1 - \omega_2| \ll (\omega_1 + \omega_2)$ Receiver 100 also receives the phase reference signal transmitted by phase reference signal source 80. In this example, the phase reference signal is a single-frequency cosinusoidal signal having a frequency $\omega_{TS}$ equal to one half of the frequency difference $\Delta\omega$ between the first frequency of the first beatable signal and the second frequency of the second beatable signal, i.e.:

$$\omega_{TS} = (\omega_1 - \omega_2)/2 \quad (9).$$

Phase reference signal source 80 transmits the phase reference signal as a modulated signal obtained by modulating the amplitude of a carrier signal with the phase reference signal. The modulated signal mod{PR} transmitted by the phase reference signal source 80 can be described mathematically as:

$$\text{mod}\{PR\} = K \cos\{(\omega_1 - \omega_2)t/2 + \lambda\} \cos\{\omega_3 t + \zeta\} \quad (10)$$

where K is the amplitude of the modulated signal at the phase reference signal source, $(\omega_1 - \omega_2)/2$ is the frequency of the phase reference signal, $\lambda$ is the phase of the phase reference signal, $\omega_3$ is the frequency of the carrier signal and $\zeta$ is the phase of the carrier signal.

The modulated signal transmitted by phase reference signal source 80 as received at receiver 100, is described by:

$$\text{rec}[\text{mod}\{PR\}] = L \cos\{(\omega_1 - \omega_2)t/2 + \lambda - (\omega_1 - \omega_2)R/2v\} \cos\{\omega_3 t + \zeta - \omega_3 R/v\} \quad (11)$$

where L is the amplitude of the phase reference signal at the receiver, and R is the distance from the phase reference source to the receiver. The receiver demodulates the amplitude modulation of the modulated signal to recover the phase reference signal {PR}. The recovered phase reference signal is described mathematically as:

$$\{PR\} = H \cos\{(\omega_1 - \omega_2)t/2 + \lambda - (\omega_1 - \omega_2)R/2v\} \quad (12)$$

In the above expression above, it is presumed that:

$$(\omega_1 - \omega_2)/2 \ll \omega_3$$

This is a normal requirement for the proper functioning of a typical AM demodulator.

Receiver 100 then measures the phase difference $\Delta\Phi$ between the phase reference signal {PR} and the beat signal BS{A+B} by subtracting the signals to leave their phase terms. This subtraction is possible because the phase reference signal {PR} and the beat signal BS{A+B} are identical in frequency as a result of the frequencies of the first and second beatable signals and the phase reference signal being chosen to provide this equality.

Receiver 100 then processes the measured phase difference $\Delta\Phi$ between the phase reference signal {PR} and beat signal BS{A+B} as follows to determine the direction angle $\phi$ of source location 32 (specifically, of phase reference signal source 80) from which the bearing is determined. The phase difference $\Delta\Phi$ measured at receiver 100 is:

$$\Delta\Phi = \frac{(-\omega_1 R_1 + \omega_2 R_2)}{2v} + \frac{\theta_1 - \theta_2}{2} - \lambda + \frac{(\omega_1 - \omega_2)R}{2v} \quad (13)$$

A source phase difference $\Psi$ that quantifies the phase relationship that the first beatable signal as transmitted by first beatable signal source 30 and the second beatable signal as transmitted by second beatable signal source 50 collectively have with the phase reference signal as transmitted by phase reference signal source 80 is set equal to the phase term in equation (13), i.e., $$\Psi = \{(\theta_1 - \theta_2)/2\} - \lambda \quad (14)$$

In equation (14), the term $(\theta_1 - \theta_2)/2$ is identical to the phase term in an equation similar to equation (8) above that describes a source beat signal obtained by summing the first beatable signal and the second beatable signal at source location 32 to form a sum signal, and demodulating the sum signal to extract the beat signal. The term $\lambda$ is identical to the phase term in equation (12) above. Thus, the source phase difference $\Psi$ can be regarded as the phase difference at source location 32 between the source beat signal and the phase reference signal.

Equation (13) can be rewritten in terms of source phase difference $\Psi$ as:

$$\Delta\Phi = \frac{(-\omega_1 R_1 + \omega_2 R_2)}{2v} + \Psi + \frac{(\omega_1 - \omega_2)R}{2v} \quad (15)$$

As noted above, data representing the phase relationship is provided to receiver 100. The phase relationship can be quantified by measuring source phase difference $\Psi$ at source location 32. The source phase difference may be measured by summing the first and second beatable signals at source location 32, demodulating the sum signal to extract the source beat signal and measuring the phase difference between the source beat signal and the phase reference signal. Alternatively, the phase relationship can be quantified by data representing phase information for each of the beatable signals and the phase reference signal. In this case, the receiver uses equation (14) to calculate source phase difference $\Psi$ from the phase information for each of the signals.

The receiver subtracts source phase difference $\Psi$ from both sides of equation (15) to obtain the following:

$$\{\Delta\Phi - \Psi\} = \frac{(-\omega_1 R_1 + \omega_2 R_2)}{2v} + \frac{(\omega_1 - \omega_2)R}{2v} \quad (16)$$

In addition, receiver 100 has data representing the value of the propagation velocity $v$ and can therefore multiply both sides of equation (16) by twice the propagation velocity and reorder the terms to obtain the following:

$$2v\{\Delta\Phi - \Psi\} = (R_2 - R)\omega_2 - (R_1 - R)\omega_1 \quad (17)$$

The path length differences $(R_2 - R)$ and $(R_1 - R)$ can be determined from the direction angle $\phi$ of source location 32 from receiver location 34 and the distance $S/2$ between phase reference signal source 80 and each of the beatable signal sources 30 and 50. Referring to FIG. 5A, it can be seen that, if distances $R$, $R_1$ and $R_2$ are much greater than distance $S$, the following approximate relationships exist:

$$R_1 - R \cong +\frac{S}{2}\cos\phi \quad (18)$$

$$R_2 - R \cong -\frac{S}{2}\cos\phi \quad (19)$$

Substituting equations (18) and (19) into equation (17) gives:

$$2v\{\Delta\Phi - \Psi\} = S\frac{(\omega_1 + \omega_2)}{2}\cos\phi \quad (20)$$

Receiver 100 has data representing the positional relationship among first beatable signal source 30, second beatable signal source 50 and phase reference signal source 80. The positional relationship data includes data representing distance $S$ between beatable signal sources 30 and 50. Additionally, receiver 100 has data representing the value of $(\omega_1 + \omega_2)/2$, which is the mean of the frequencies of the beatable signals, or can measure this value. Accordingly, the receiver can calculate the value of $\cos\phi$ by multiplying both sides of equation (20) by $2/S(\omega_1 + \omega_2)$, i.e.:

$$\frac{4v\{\Delta\Phi - \Psi\}}{S(\omega_1 + \omega_2)} = \cos\phi \quad (21)$$

Receiver 100 additionally includes an arc cosine computation algorithm or an arc cosine look-up table, and can therefore determine direction angle $\phi$ from equation (21) as follows:

$$\phi = \cos^{-1}\left\{\frac{4v\{\Delta\Phi - \Psi\}}{S(\omega_1 + \omega_2)}\right\} \quad (22)$$

Finally, the cosine function is a circular function. This means that the relationship between direction angle $\phi$ and the value of $$\cos^{-1}\left\{\frac{4v\{\Delta\Phi - \Psi\}}{S(\omega_1 + \omega_2)}\right\}$$

can be multi-valued and ambiguous. The relationship becomes unambiguous (except for the "half-plane" ambiguity described below) as long as distance $S$ meets the condition:

$$S < \frac{4\pi v}{(\omega_1 + \omega_2)}$$

Direction angle $\phi$ determined by receiver 100 with respect to first reference direction RD1 does not unambiguously define the bearing of source location 32 from receiver location 34. In the above-described three-dimensional world, the bearing of source location 32 comprises an azimuth and an elevation and the bearing is one of the infinite number of possible directions angled at direction angle $\phi$ relative to first reference direction RD1. The possible directions collectively define the curved surface of a right cone (not shown) having a half-angle equal to the direction angle and an axis of symmetry in reference direction RD1.

In the above-described two-dimensional world, the bearing of source location 32 consists of an azimuth only and is less ambiguous than in a three-dimensional world. In the two-dimensional world, the bearing of phase reference signal source 80 from receiver 100 is one of the two directions at which the above-mentioned cone intersects the plane in which the source location and the receiver location are located. In the example shown in FIG. 5A, the two directions are indicated by a line 77 angled at direction angle $\phi$ anti-clockwise relative to reference direction RD1 and a line 78 angled at direction angle $\phi$ clockwise relative to reference direction RD1.

In some applications in a two-dimensional world, the ambiguity with the system 10 determines the bearing of source location 32 from receiver location 34 can be eliminated by imposing a constraint on the position of the source location relative to the receiver location, or vice versa. In one example, receiver location 34 is a fixed location and source location 32 is the location of an object or person to which beatable signal sources 30 and 50 and phase reference signal source 80 are attached and whose movement is tracked by receiver 100. Beatable signal sources 30 and 50 and phase reference signal source 80 are mounted on the person or object in a manner that maintains second beatable signal source 50 spatially offset from first beatable signal source 30 in reference direction RD1 regardless of the orientation of the person or object. If the range of movement of the object is constrained so that the object can be only located in a region corresponding to one half of the cone, then the bearing of the object is equal to the direction angle corresponding to that one half of the cone. In an example, receiver 100 is fixed on the ceiling of a room and the signal sources are located on a moving object whose position within the room is tracked by the receiver. If the motion of the object is constrained to move in a plane parallel to the floor of the room, then the cone intersects the plane parallel to the floor of the room in an arc. If the motion of the object is further constrained, e.g., the object is located on a linear assembly line, then the assembly line intersects the arc at a single point. In this case, the bearing from receiver 100 of source location 32 on the moving object is uniquely defined.

Once receiver 100 has determined bearing of source location 32, a first communications transceiver (not shown) at receiver location 34 can align its antenna in accordance with the bearing and transmit a unidirectional signal modulated with information representing the bearing determined by the receiver to a second communications transceiver (not shown) at source location 32. The second transceiver receives this signal with a multi-directional antenna as the bearing of the first transceiver is unknown. Then, the second communications transceiver can align its directional antenna in accordance with the received bearing information. Thereafter, the first and second communications transceivers can communicate using low-power unidirectional signals. The transmission of bearing information instead of position information is less likely to disclose the position of the first transceiver to an enemy or other eavesdropper.

In an embodiment in which the bearing determined by the receiver has two possible values, the transceiver at receiver location 34 can perform the above communication process twice, once with each possible value of the bearing, and determine which of the values of the bearing successfully results in a response from source location 32. The transceiver can then direct its antenna in accordance with that value of the bearing.

Systems 13 and 14 described below with reference to FIGS. 8A and 9A remove the ambiguity with which the bearing of the source location from the receiver location is determined in a two-dimensional world. A system 16 described below with reference to FIGS. 10A and 10B removes the ambiguity with which the bearing of source location from the receiver location is determined in a three-dimensional world. The mathematics of systems 13, 14 and 16 can be derived from the mathematical analysis set forth above with reference to FIGS. 5A and 5B and is not described herein.

In a system based on system 10 for determining the bearing of source location 32 from receiver location 34 in accordance with a second embodiment of the invention, the phase reference signal is single-frequency signal having a frequency $\omega_{TS}$ equal to one half of the frequency difference $\Delta\omega$ between the first frequency $\omega_1$ of the first beatable signal and the second frequency $\omega_2$ of the second beatable signal, i.e., $\omega_{TS}=\Delta\omega/2=(\omega_1-\omega_2)/2$. Phase reference signal source 80 transmits such phase reference signal directly. Since the phase reference signal is transmitted directly, receiver 100 does not subject the received phase reference signal to demodulation.

Figure 6A:
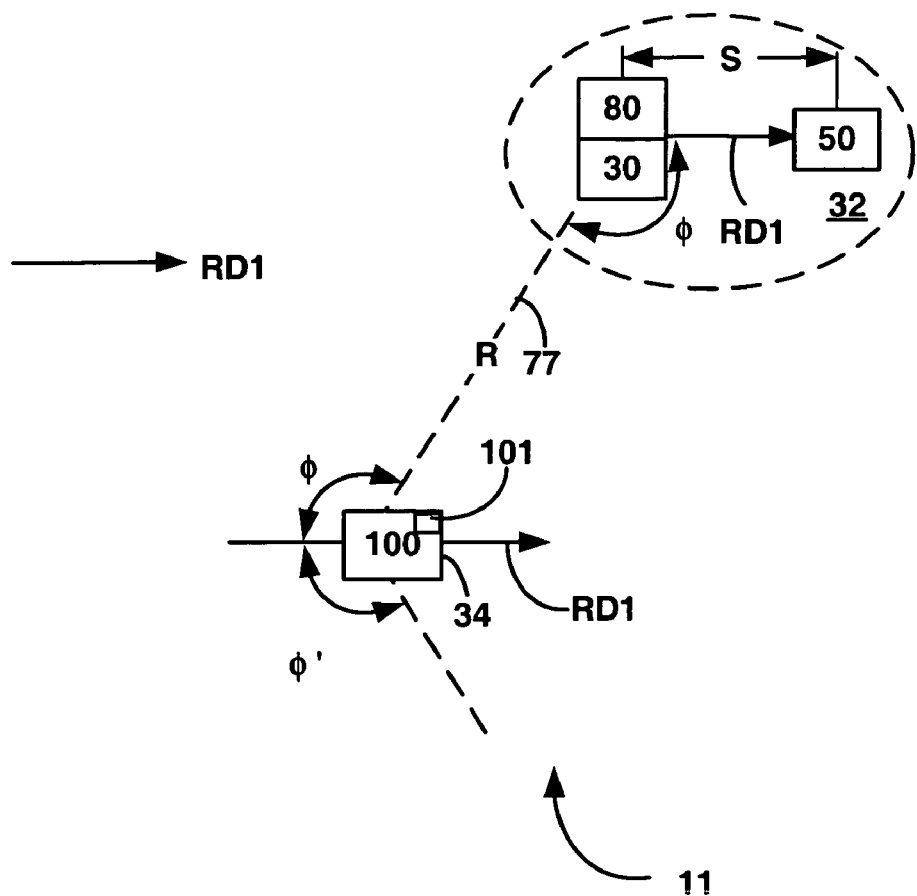
FIG. 6A is a schematic drawing showing a system for determining the bearing of a source location from a receiver location in accordance with a third embodiment of the invention.

FIG. 6A is a schematic drawing showing a system 11 for determining the bearing of source location 32 from receiver location 34 in accordance with a third embodiment of the invention. In system 11, located at source location 32 are first beatable signal source 30 and second beatable signal source 50 as described above with reference FIG. 5A. Additionally located at source location 32 is phase reference signal source 80. However, the positional relationship among first beatable signal source 30, second beatable signal source 50, phase reference signal source 80 in system 11 differs from that in system 10 described above with reference to FIG. 5A in that phase reference signal source 80 and first beatable signal source 30 are collocated at the first position. The second beatable signal source is spatially offset from the first beatable signal source and the phase reference signal source by distance S in first reference direction RD1. First beatable signal source 30, second beatable signal source 50, and phase reference signal source 80 have a positional relationship quantified by distance S and first reference direction RD1. Data representing the positional relationship is provided to receiver 100, where it is stored in processor 101.

The spectrum of the signals in an example of system 11 shown FIG. 6A is shown in FIG. 5B. The phase reference signal is a square wave or a cosine wave having a frequency $\omega_{TS}$ equal to a harmonic of the frequency difference $(\omega_1-\omega_2)$ between the first frequency $\omega_1$ of the first beatable signal and the second frequency $\omega_2$ of the second beatable signal. In the example shown, the frequency $\omega_{TS}$ of the phase reference signal is one half of the frequency difference $(\omega_1-\omega_2)$, i.e., $\omega_{TS}=(\omega_1-\omega_2)/2$ and is therefore equal to the frequency of the beat signal component of the sum signal obtained by summing the first beatable signal and the second beatable signal. Phase reference signal source 80 transmits the phase reference signal as a modulated signal obtained by modulating the amplitude of a carrier signal (not shown) with the phase reference signal.

At source location 32, the first beatable signal transmitted by first beatable signal source 30 and the second beatable signal transmitted by second beatable signal source 50 collectively have a phase relationship with the phase reference signal transmitted by phase reference signal source 80. As described above, the phase relationship may be quantified by a source phase difference between a source beat signal and the phase reference signal. The source beat signal is obtained by summing the first beatable signal and the second beatable signal and demodulating the resulting sum signal, as described above. Data representing the phase relationship, e.g., data representing the source phase difference, is provided to receiver 100, where it stored in processor 101.

In this embodiment of system 11, receiver 100 determines the direction angle $\phi$ of source location 32 relative to first reference direction RD1 as follows. Receiver 100 receives the first beatable signal, the second beatable signal and the modulated signal that includes the phase reference signal. The receiver sums the first beatable signal and the second beatable signal to generate a sum signal, and demodulates the sum signal to extract the beat signal. Additionally, the receiver demodulates the modulated signal to recover the phase reference signal. The receiver measures the phase difference $\Delta\Phi$ between the beat signal and the phase reference signal. Processor 101 processes the measured phase difference $\Delta\Phi$ in the manner described above to determine the direction angle $\phi$, and hence the bearing, of source location 32 relative to the first reference direction RD1. The determination is based in part on the phase relationship and the positional relationship.

In a system based on system 11 for determining the bearing of source location 32 from receiver location 34 in accordance with a fourth embodiment of the invention, the phase reference signal is a single-frequency signal having same frequency $\omega_{TS}$ as the phase reference signal of the previous embodiment. In this embodiment, the phase reference signal source 80 transmits the phase reference signal directly. Since the phase reference signal is transmitted directly, receiver 100 does not demodulate the received phase reference signal.

Figure 6B:
FIG. 6B is a schematic drawing showing the spectrum of the signals in the system shown in FIG. 6A in accordance with a fifth embodiment of the invention.

FIG. 6B is a schematic drawing showing the spectrum of the signals in a system based on system 11 shown FIG. 6A in accordance with a fifth embodiment of the invention. In this fifth embodiment, the phase reference signal is a single-frequency signal having a frequency $\omega_{TS}$ greater than the second frequency $\omega_2$ and differing from the first frequency $\omega_1$ by a frequency difference equal to a harmonic of the frequency difference ($\omega_1-\omega_2$) between the first frequency $\omega_1$ of the first beatable signal and the second frequency $\omega_2$ of the second beatable signal. In the example shown, the frequency $\omega_{TS}$ of the phase reference signal differs from the first frequency by a frequency difference equal to the frequency difference ($\omega_1-\omega_2$) between the first frequency and the second frequency, i.e., ($\omega_{TS}-\omega_1$)=($\omega_1-\omega_2$). In this embodiment, phase reference signal source 80 is collocated with first beatable signal source and transmits the phase reference signal directly. Since phase reference signal source 80 and first beatable signal source 30 are collocated, the phase reference signal and the first beatable signal can be summed to generate an additional beat signal whose phase difference from the beat signal is measured.

In this embodiment of system 11, a calibrating signal having a frequency $\omega_X$, where $\omega_X=\Delta\omega=(\omega_1-\omega_2)$, is used to calibrate the frequencies of the beatable signals and of the phase reference signal. The calibrating signal is provided to first beatable signal source 30. The first beatable signal source mixes the first beatable signal with the calibrating signal to generate a mixed signal. A first filter selects the lower sideband of the mixed signal as the second beatable signal at the second frequency $\omega_2$. The second beatable signal is provided to second beat signal source 50 for transmission. A second filter selects the upper sideband of the mixed signal as the phase reference signal. The phase reference signal is provided to phase reference signal source 80 for transmission.

In this embodiment of system 11, receiver 100 determines the direction angle $\phi$, and hence the bearing, of source location 32 relative to the first reference direction RD1 as follows. Receiver 100 receives the first beatable signal, the second beatable signal and the phase reference signal. Receiver 100 sums the first beatable signal and the second beatable signal to generate a first sum signal and sums the phase reference signal and the first beatable signal to generate a second sum signal. The receiver demodulates the first sum signal to extract a first beat signal and demodulates the second sum signal to extract a second beat signal. The second beat signal has the same frequency as the first beat signal because the difference in frequency $\Delta\omega$ between the first beatable signal and the second beatable signal is the same as that between the phase reference signal and the first beatable signal. Receiver 100 measures the phase difference $\Delta\Phi$ between the first beat signal and the second beat signal. Processor 101 then processes the measured phase difference $\Delta\Phi$ in the manner described above to determine the direction angle $\phi$ of source location 32 relative to first reference direction RD1. The determination is based in part on the phase relationship and the positional relationship, as described above with reference to FIG. 6A.

Figure 7A:
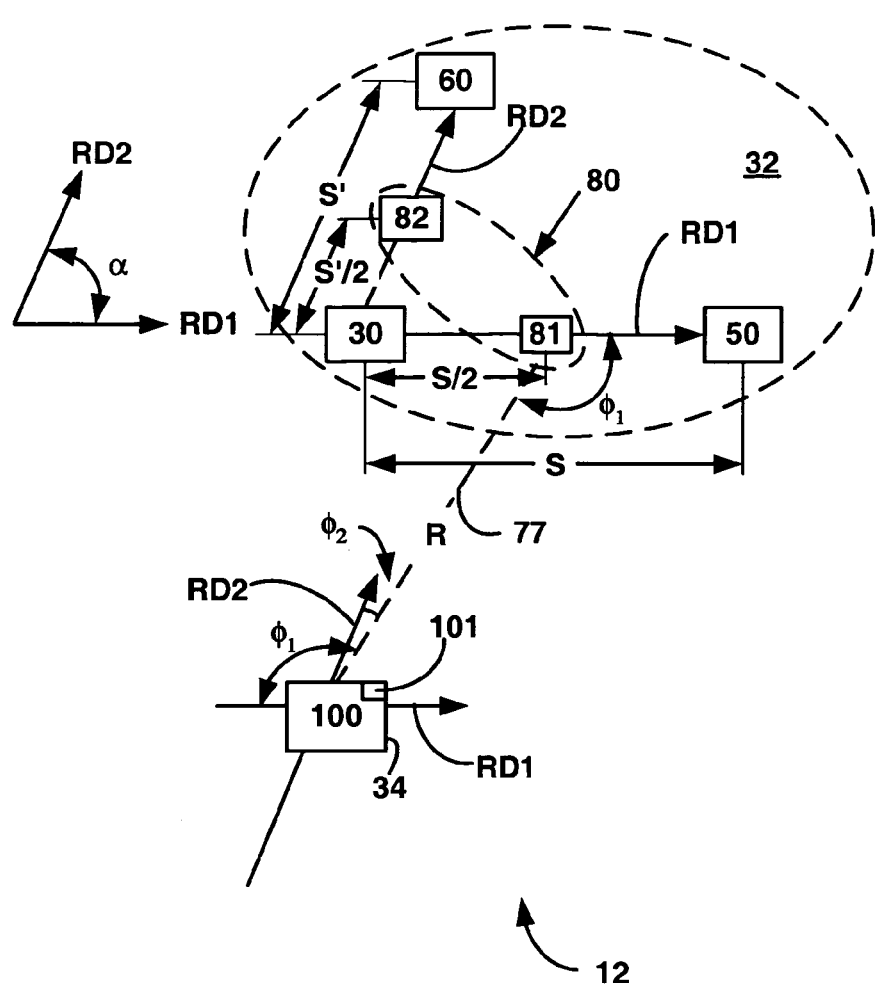
FIG. 7A is a schematic drawing showing a system for determining the bearing of a source location from a receiver location in accordance with a sixth embodiment of the invention.

FIG. 7A is a schematic drawing showing a system 12 for determining the bearing of source location 32 from receiver location 34 in accordance with a sixth embodiment of the invention. In system 12, receiver 100 unambiguously determines the bearing of source location 32 in a two-dimensional world, but determines the bearing ambiguously in a three-dimensional world. The ambiguity with which the bearing is determined in the two-dimensional world is eliminated by defining two non-parallel reference directions and determining a respective direction angle of source location 32 from receiver location 34 relative to each reference direction.

In system 12, located at source location 32 are first beatable signal source 30 and second beatable signal source 50 as described above with reference to FIG. 5A, and a third beatable signal source 60 located at a third position. The third position is spatially offset from the first position by a distance S' in a second reference direction RD2. The angle between first reference direction RD1 and second reference direction RD2 is designated $\alpha$. In an embodiment, angle $\alpha$ is equal to 90°. Third beatable signal source 60 transmits a third beatable signal having a third frequency $\omega_3$.

Additionally located at source location 32 is phase reference signal source 80, which in this embodiment is composed of a first phase reference signal generator 81 and a second phase reference signal generator 82 both located at source location 32. Although physically separated, phase reference signal generator 81 is physically close enough to phase reference signal generator 82 that phase reference signal generator 81 and phase reference signal generator 82 can be regarded as being collocated, and constituting a single phase reference signal source 80 whose bearing is specifically determined by receiver 100. First phase reference signal generator 81 is located between first beatable signal source 30 and second beatable signal source 50. In the example shown in FIG. 7A, first phase reference signal generator 81 is located is mid-way between first beatable signal source 30 and second beatable signal source 50. Second phase reference signal generator 82 is located between first beatable signal source 30 and third beatable signal source 60. In the example shown in FIG. 7A, second phase reference signal generator 82 is located mid-way between the first beatable signal source and the third beatable signal source.

First beatable signal source 30, second beatable signal source 50 and first phase reference signal generator 81 have a first positional relationship quantified by distances S and S/2 and first reference direction RD1, as described above. First beatable signal source 30, third beatable signal source 60 and second phase reference signal generator 82 have a second positional relationship quantified by distances S' and S'/2, second reference direction RD2 and angle $\alpha$. Data representing the first positional relationship and the second positional relationship is provided to receiver 100, where it is stored in the processor 101.

At receiver location 34, receiver 100 determines a first direction angle $\phi_1$ of source location 32 with respect to first reference direction RD1, and additionally determines a second direction angle $\phi_2$ of source location 32 with respect to second reference direction RD2. Receiver 100 then uses first direction angle $\phi_1$ and second direction angle $\phi_2$ to make a determination of the bearing of source location 32 from receiver location 34 that is unambiguous in a two-dimensional world.

Figure 7B:
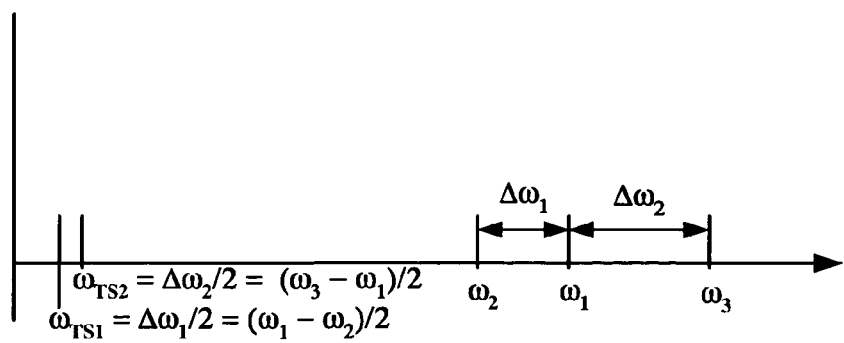
FIG. 7B is a schematic drawing showing the spectrum of the signals in the system shown in FIG. 7A.

FIG. 7B is a schematic drawing showing the spectrum of the signals in an example of system 12 shown in FIG. 7A. All the signals are single-frequency signals. The third frequency $\omega_3$ of the third beatable signal transmitted by third beatable signal source 60 differs from the first frequency $\omega_1$ of the first beatable signal transmitted by first beatable signal source 30 by a frequency difference $\Delta\omega_2$ that in this example is greater than the frequency difference $\Delta\omega_1$ between the first frequency $\omega_1$ and the second frequency $\omega_2$ of the second beatable signal transmitted by second beatable signal source 50. In the example shown, the third frequency is greater than the first frequency.

First phase reference signal generator 81 transmits a first phase reference signal having a frequency $\omega_{TS1}$ equal to a harmonic of first frequency difference $\Delta\omega_1$. In an example, the frequency of the first phase reference signal is equal to one half of the first frequency difference, i.e., $\omega_{TS1}=\Delta\omega_1/2=(\omega_1-\omega_2)/2$, and is therefore equal to the frequency of the beat signal obtained by summing the first beatable signal and the second beatable signal. Second phase reference signal generator 82 transmits a second phase reference signal having a second phase reference frequency $\omega_{TS2}$ equal to a harmonic of second frequency difference $\Delta\omega_2$. In an example, the frequency of the second phase reference signal is equal to one half of the second frequency difference, i.e., $\omega_{TS2}=\Delta\omega_2/2=(\omega_3-\omega_1)/2$, and is therefore equal to the frequency of the beat signal obtained by summing the first beatable signal and the third beatable signal.

At source location 32, the first beatable signal transmitted by first beatable signal source 30 and the second beatable signal transmitted by second beatable signal source 50 collectively have a first phase relationship with the first phase reference signal transmitted by first phase reference signal generator 81. The first phase relationship may be quantified by a first source phase difference between a first source beat signal and the first phase reference signal, in a manner similar to that described above. The first source beat signal is obtained by summing the first beatable signal and the second beatable signal and demodulating the resulting sum signal. Data representing the first phase relationship, e.g., data representing the above-described first source phase difference, is provided to receiver 100, where it stored in processor 101. Additionally at source location 32, the first beatable signal transmitted by first beatable signal source 30 and the third beatable signal transmitted by third beatable signal source 60 collectively have a second phase relationship with the second phase reference signal transmitted by second phase reference signal generator 82. The second phase relationship may be quantified by a second source phase difference between a second source beat signal and the second phase reference signal, in a manner similar to that described above. The second source beat signal is obtained by summing the first beatable signal and the third beatable signal and demodulating the resulting sum signal. Data representing the second phase relationship, e.g., data representing the above-described second source phase difference, is provided to receiver 100, where it stored in processor 101.

The frequencies of the various signal sources in the embodiment shown in FIGS. 7A and 7B can be set using a first calibrating signal and a second calibrating signal. The first calibrating signal of frequency $\Delta\omega_1=(\omega_1-\omega_2)$ is provided to first beatable signal source 30. The first beatable signal source mixes the first beatable signal with the first calibrating signal to generate a first mixed signal. A first filter selects a lower sideband of the first mixed signal as the second beatable signal at the second frequency $\omega_2$. Additionally, first beatable signal source 30 subjects the first calibrating signal to a frequency division by two to provide the first phase reference signal. The first beatable signal source provides the first phase reference signal to first phase reference signal generator 81 and provides the second beatable signal to second beatable signal source 50.

The second calibrating signal of frequency $\Delta\omega_2=(\omega_3-\omega_1)$ is also provided to first beatable signal source 30. The first beatable signal source mixes the first beatable signal with the first phase reference signal to generate a second mixed signal. A second filter selects an upper sideband of the second mixed signal to obtain the third beatable signal at the third frequency $\omega_3$. Additionally, first beatable signal source 30 subjects the second calibrating signal to a frequency division by two to provide the second phase reference signal. The first beatable signal source provides the second phase reference signal to second phase reference signal generator 82 and provides the third beatable signal to third beatable signal source 60.

In this embodiment of system 12, the receiver 100 determines the direction angle $\phi_1$ of source location 32 relative to first reference direction RD1 and determines the direction angle $\phi_2$ of source location 32 relative to second reference direction RD2 as follows. Receiver 100 receives the first beatable signal, the second beatable signal, the third beatable signal, the first phase reference signal and the second phase reference signal. Receiver 100 sums the first beatable signal and the second beatable signal to generate the first sum signal and demodulates the first sum signal to extract a first beat signal. The receiver measures a first phase difference $\Delta\Phi_1$ between the first beat signal and the first phase reference signal. The processor 101 processes measured first phase difference $\Delta\Phi_1$ in a manner similar to that described above to determine the first direction angle $\phi_1$ of source location 32 relative to first reference direction RD1. The determination is based in part on the first phase relationship and the first positional relationship.

The receiver 100 additionally sums the first beatable signal and the third beatable signal to generate a second sum signal and demodulates the second sum signal to extract a second beat signal. The receiver 100 measures a second phase difference $\Delta\Phi_2$ between the second beat signal and the second phase reference signal. The processor 101 processes measured second phase difference $\Delta\Phi_2$ in a manner similar to that described above to determine the second direction angle $\phi_2$ of source location 32 relative to second reference direction RD2. The determination is based in part on the second phase relationship and the second positional relationship.

In a two-dimensional world, first direction angle $\phi_1$ and second direction angle $\phi_2$ collectively allow the bearing of phase reference signal source 80 to be determined unambiguously. Line 77 angled at first direction angle $\phi_1$ relative to first reference direction RD1 forms a first cone (not shown) when rotated about the first reference direction. Likewise, line 77 angled at second direction angle $\phi_2$ relative to second reference direction RD2 forms a second cone (not shown) when rotated about the second reference direction. The first and second cones intersect the plane containing system 12 along line 77. The bearing of phase reference signal source 80 in the two-dimensional world is thus the direction of line 77 from receiver 100.

In a three-dimensional world, the first and second cones formed when line 77 is rotated about first reference direction RD1 and second reference direction RD2, respectively, intersect along two lines. The bearing of phase reference signal source 80 in the three-dimensional world is along one or the other of the two lines formed by the intersecting cones. One of the lines is line 77. The other of the lines (not shown) extends in a direction out of the plane that contains the beatable signal sources, phase reference signal source 80 and receiver 100.

In a system based on system 12 for determining the bearing of source location 32 from receiver location 34 in accordance with a seventh embodiment of the invention, the first phase reference signal is a square wave or a cosine wave having the same frequency $\omega_{TS1}$ as the first phase reference signal of the sixth embodiment and the second phase reference signal is a square wave or a cosine wave having the same frequency $\omega_{TS2}$ as the second phase reference signal of the sixth embodiment.

First phase reference signal generator 81 transmits the first phase reference signal as a first modulated signal obtained by modulating the amplitude of a first carrier signal (not shown) with the first phase reference signal. Second phase reference signal generator 82 transmits the second phase reference signal as a second modulated signal obtained by modulating the amplitude of a second carrier signal (not shown) with the second phase reference signal. In this embodiment, receiver 100 receives the first modulated signal and subjects the first modulated signal to AM demodulation to recover the first phase reference signal. Additionally, receiver 100 receives the second modulated signal and subjects the second modulated signal to AM demodulation to recover the second phase reference signal. The receiver then determines the bearing of source location 32 in the manner described above with reference to FIG. 7A.

Figure 8A:
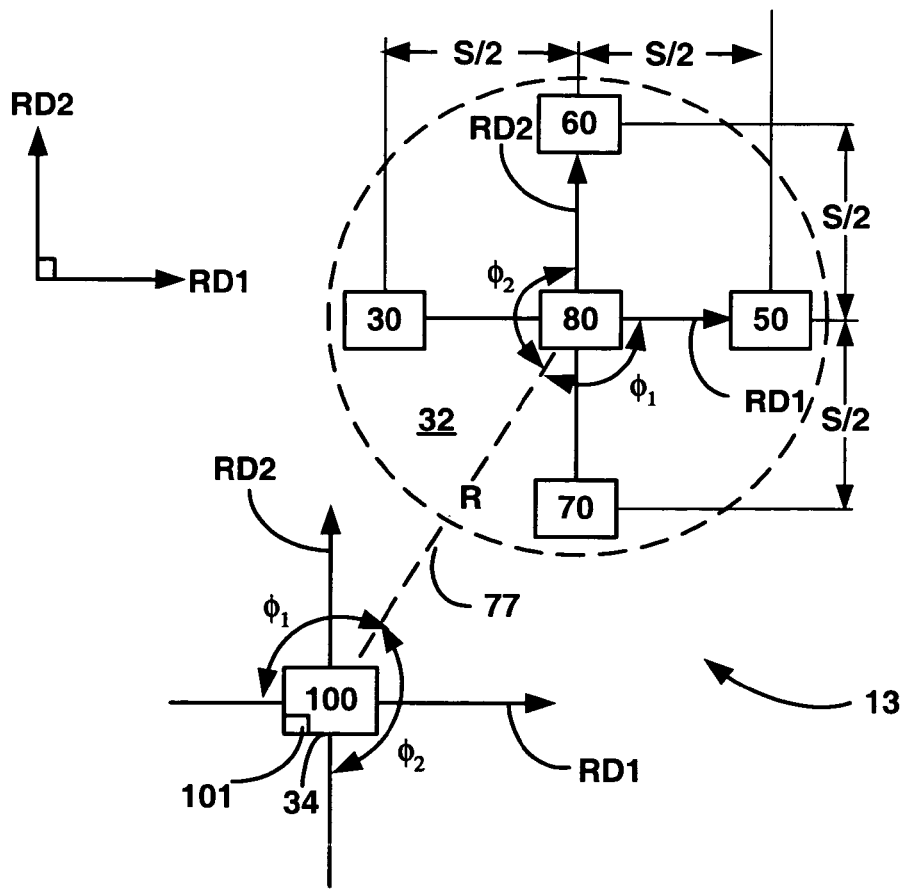
FIG. 8A is a schematic drawing showing a system for determining the bearing of a source location from a receiver location in accordance with an eighth embodiment of the invention.

FIG. 8A is a schematic drawing showing a system 13 for determining the bearing of source location 32 from receiver location 34 in accordance with an eighth embodiment of the invention. System 13 has only one phase reference signal source.

Similarly to system 12, system 13 unambiguously determines the bearing of source location 32 in a two-dimensional world, but determines the bearing ambiguously in a three-dimensional world. System 13 determines a direction angle of source location 32 from the receiver 100 relative to each of two non-parallel reference directions. In system 13, receiver 100 determines a first direction angle $\phi_1$ of source location 32 with respect to first reference direction RD1 and additionally determines a second direction angle $\phi_2$ of source location 32 with respect to a second reference direction RD2. In this embodiment, second reference direction RD2 is orthogonal to first reference direction RD1. System 13 uses first direction angle $\phi_1$ and second direction angle $\phi_2$ to determine the bearing of source location 32 from the receiver location 32 unambiguously in a two-dimensional world. In system 13, phase-sensitive receiver 100 measures the phase differences between two beat signals each formed from a respective pair of beatable signals and a phase reference signal recovered from a modulated signal.

In system 13, located at source location 32 are first beatable signal source 30, second beatable signal source 50 and phase reference signal source 80 arranged as described above with reference to FIG. 5A. In system 13, phase reference signal source 80 is mid-way between first beatable signal source 30 and second beatable signal source and transmits a modulated signal that includes the phase reference signal. Additionally located at source location 32 are a third beatable signal source 60 and a fourth beatable signal source 70 located respectively at a third position and a fourth position. The third beatable signal source 60 transmits a third beatable signal having a third frequency $\omega_3$. The fourth beatable signal source 70 transmits a fourth beatable signal having a fourth frequency $\omega_4$.

Third beatable signal source 60 is spatially offset from phase reference signal source 80 by a distance S/2 in the second reference direction RD2 orthogonal to the first reference direction RD1. Fourth beatable signal source 70 is spatially offset from phase reference signal source 80 by a distance S/2 in a direction opposite second reference direction RD2.

First beatable signal source 30, second beatable signal source 50 and phase reference signal source 80 have a first positional relationship quantified by distances S and S/2 and first reference direction RD1, as described above. Third beatable signal source 60, fourth beatable signal source 70 and phase reference signal source 80 have a second positional relationship quantified by distances S and S/2, second reference direction RD2 and the angle between the first reference direction and the second reference direction (a right angle in the example shown). Data representing the first positional relationship and the second positional relationship is provided to the receiver 100, where it is stored in the processor 101.

In the example shown in FIG. 8A, phase reference signal source 80 is located a distance S/2 from each of first beatable signal source 30, second beatable signal source 50, third beatable signal source 60, and fourth beatable signal source 70. In another example, phase reference signal source 80 is asymmetrically located with respect to third beatable signal source 60 and fourth beatable signal source 70. In yet another example, phase reference signal source 80 is asymmetrically located with respect to first beatable signal source 30 and second beatable signal source 50. In yet another example, phase reference signal source 80 is asymmetrically located with respect to all of first beatable signal source 30, second beatable signal source 50, third beatable signal source 60 and fourth beatable signal source 70.

Figure 8B:
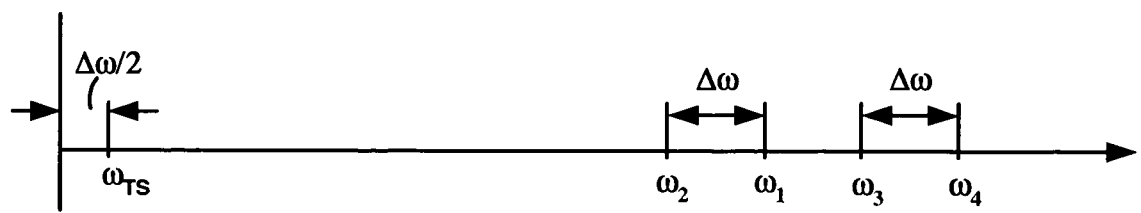
FIG. 8B is a schematic drawing showing the spectrum of the signals in the system shown in FIG. 8A in accordance with a ninth embodiment of the invention.

FIG. 8B is a schematic drawing showing the spectrum of the signals in an example of system 13 shown in FIG. 8A. The third frequency $\omega_3$ of the third beatable signal transmitted by third beatable signal source 60 differs from the fourth frequency $\omega_4$ of the fourth beatable signal transmitted by fourth beatable signal source 70 by a frequency difference $\Delta\omega=(\omega_4-\omega_3)$ equal to the frequency difference $\Delta\omega=(\omega_1-\omega_2)$ between the first frequency $\omega_1$ of the first beatable signal transmitted by first beatable signal source 30 and the second frequency $\omega_2$ of the second beatable signal transmitted by second beatable signal source 50. The phase reference signal transmitted by phase reference signal source 80 is a square wave or a cosine wave having a frequency $\omega_{TS}$ equal to a harmonic of the frequency difference $\Delta\omega$ between the first frequency $\omega_1$ and the second frequency $\omega_2$. In an example, the frequency $\omega_{TS}$ of the phase reference signal is one half of the frequency difference $\Delta\omega$, i.e., $\omega_{TS}=\Delta\omega/2$ and is therefore equal to the frequency of the first beat signal obtained by summing the first beatable signal and the second beatable signal and to the frequency of the second beat signal obtained by summing the third beatable signal and the fourth beatable signal. Phase reference signal source 80 transmits the phase reference signal as a modulated signal obtained by modulating the amplitude of a carrier signal (not shown) with the phase reference signal.

At source location 32, the first beatable signal transmitted by first beatable signal source 30 and the second beatable signal transmitted by second beatable signal source 50 collectively have a first phase relationship with the phase reference signal transmitted by phase reference signal generator 80. The first phase relationship may be quantified by a first source phase difference between a first source beat signal and the phase reference signal, as described above. The first source beat signal is obtained by summing the first beatable signal and the second beatable signal and demodulating the resulting sum signal. Additionally at source location 32, the third beatable signal transmitted by third beatable signal source 60 and the fourth beatable signal transmitted by fourth beatable signal source 70 collectively have a second phase relationship with the phase reference signal transmitted by phase reference signal generator 80. The second phase relationship may be quantified by a second source phase difference between a second source beat signal and the phase reference signal, in a manner similar to that described above. The second source beat signal is obtained by summing the third beatable signal and the fourth beatable signal and demodulating the resulting sum signal. Data representing the first phase relationship and the second phase relationship, e.g., the first source phase difference and the second source phase difference, respectively, is provided to the receiver 100, where it is stored in processor 101.

In this embodiment of system 13, the receiver 100 determines the direction angle $\phi_1$ of source location 32 relative to first reference direction RD1 and determines the direction angle $\phi_2$ of source location 32 relative to second reference direction RD2 as follows. Receiver 100 receives the first beatable signal, the second beatable signal, the third beatable signal, the fourth beatable signal and the modulated signal that includes the phase reference signal. The receiver sums the first beatable signal and the second beatable signal to generate a first sum signal, and demodulates the first sum signal to extract a first beat signal. The receiver subjects the modulated signal to AM demodulation to recover the phase reference signal. The receiver measures a first phase difference $\Delta\Phi_1$ between the first beat signal and the phase reference signal. Processor 101 processes measured first phase difference $\Delta\Phi_1$ in a manner similar to that described above to determine first direction angle $\phi_1$ of source location 32 relative to first reference direction RD1. The determination is based in part on the first phase relationship and the first positional relationship.

Receiver 100 also sums the third beatable signal and the fourth beatable signal to generate a second sum signal, and demodulates the second sum signal to extract a second beat signal. The receiver measures a second phase difference $\Delta\Phi_2$ between the second beat signal and the phase reference signal. Processor 101 processes measured second phase difference $\Delta\Phi_2$ in a manner similar to that described above to determine the second phase angle $\phi_2$ of source location 32 relative to second reference direction RD2. The determination is based in part on the second phase relationship and the second positional relationship.

Determining second direction angle $\phi_2$ in addition to first direction angle $\phi_1$ eliminates the ambiguity with which the bearing of source location 32 from receiver location 34 is determined in a two-dimensional world, and reduces the ambiguity with which the bearing is determined in a three-dimensional world, as described above with reference to FIGS. 7A and 7B.

In a system based on system 13 for determining the bearing of source location 32 from receiver location 34 in accordance with a ninth embodiment of the invention, the phase reference signal is single-frequency signal having the same frequency $\omega_{TS}$ as the phase reference signal of the eighth embodiment. In this ninth embodiment, phase reference signal source 80 transmits the phase reference signal directly. Since the phase reference signal is transmitted directly, receiver 100 does not demodulate the received phase reference signal.

Figure 9A:
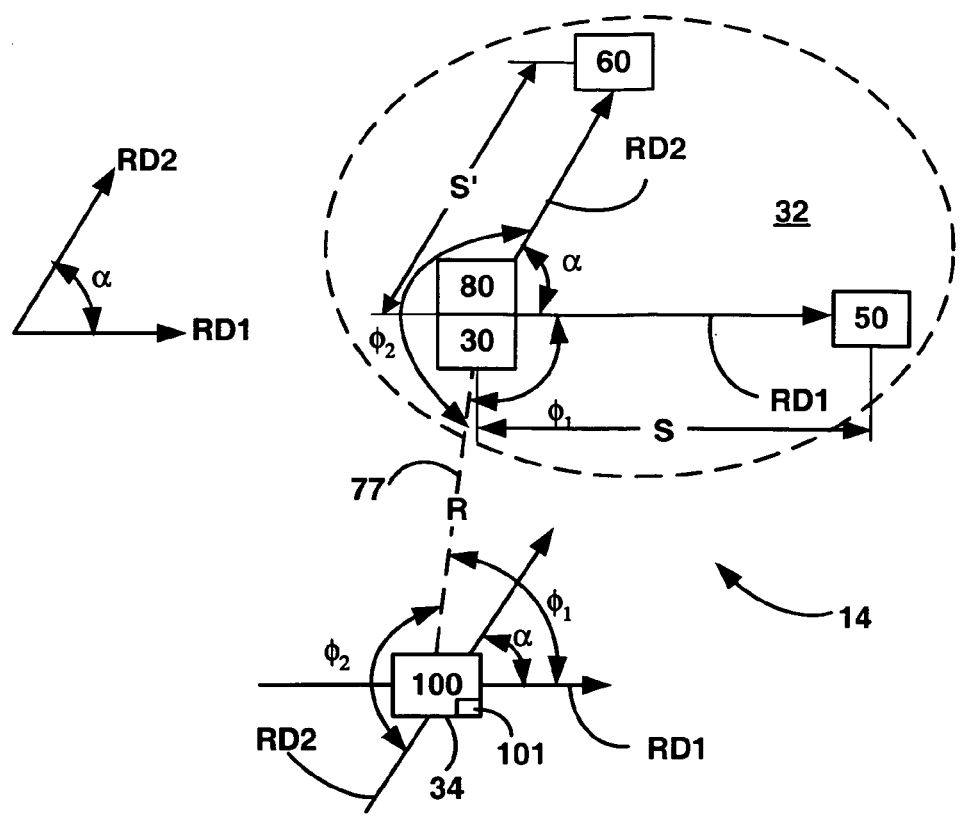
FIG. 9A is a schematic drawing of a system for determining the bearing of a source location from a receiver location in accordance with a tenth embodiment of the invention.

FIG. 9A is a schematic drawing of a system 14 that determines the bearing of source location 32 from receiver location 34 in accordance with a tenth embodiment of the invention. In system 14, receiver 100 unambiguously determines the bearing of source location 32 in a two-dimensional world, but determines the bearing ambiguously in a three-dimensional world. The ambiguity with which the bearing is determined in the two-dimensional world is eliminated by defining two non-parallel reference directions and determining a respective direction angle of source location 32 from receiver location 34 relative to each reference direction.

In system 14, located at source location 32 are first beatable signal source 30, second beatable signal source 50 and phase reference signal source 80 arranged as described above with reference to FIG. 6A. Thus, in system 14, phase reference signal source 80 is collocated with first beatable signal source 30. Additionally located at source location 32 is a third beatable signal source 60 located at a third position. The third beatable signal source 60 transmits a third beatable signal having a third frequency $\omega_3$. Third beatable signal source 60 is spatially offset from first beatable signal source 30 by a distance S' in a second reference direction RD2. The angle between first reference direction RD1 and second reference direction RD2 is designated $\alpha$. In one embodiment, angle $\alpha$ is a right angle.

At receiver location 34, receiver 100 determines a first direction angle $\phi_1$ of source location 32 with respect to first reference direction RD1 and additionally determines a second direction angle $\phi_2$ of source location 32 with respect to a second reference direction RD2. System 14 uses first direction angle $\phi_1$ and second direction angle $\phi_2$ to make a determination of the bearing of source location 32 from receiver location 34 that is unambiguous in a two-dimensional world.

First beatable signal source 30, second beatable signal source 50 and phase reference signal source 80 collectively have a first positional relationship quantified by distance S and first reference direction RD1, as described above. First beatable signal source 30, third beatable signal source 60 and phase reference signal source 80 collectively have a second positional relationship quantified by distance S', second reference direction RD2 and angle $\alpha$. Data representing the first positional relationship and the second positional relationship is provided to receiver 100, where it is stored in processor 101.

Figure 9B:
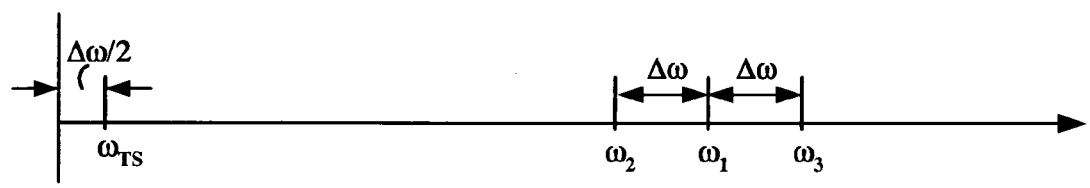
FIG. 9B is a schematic drawing showing the spectrum of the signals in the system shown in FIG. 9A in accordance with an eleventh embodiment of the invention.

FIG. 9B is a schematic drawing showing the spectrum of the signals in an example of system 14 shown in FIG. 9A. The first frequency $\omega_1$ of the first beatable signal transmitted by first beatable signal source 30 is greater than the second frequency $\omega_2$ of the second beatable signal transmitted by second beatable signal source 50 and differs therefrom by a first frequency difference $\Delta\omega=(\omega_1-\omega_2)$. The third frequency $\omega_3$ of the third beatable signal transmitted by third beatable signal source 60 is greater than the first frequency $\omega_1$ and differs therefrom by a second frequency difference $\Delta\omega=\omega_3-\omega_1$) equal to the first frequency difference. The phase reference signal is a square wave or a cosine wave having a frequency $\omega_{TS}$ equal to a harmonic of the first frequency difference. In the example shown, the phase reference signal is a square wave or cosine wave having a frequency $\omega_{TS}$ equal to one half of the first frequency difference $\Delta\omega$, and is equal to the frequency of the beat signal generated from the first beatable signal and the second beatable signal. Phase reference signal source 80 transmits the phase reference signal as a modulated signal obtained by modulating the amplitude of a carrier signal (not shown) with the phase reference signal.

At source location 32, the first beatable signal transmitted by first beatable signal source 30 and the second beatable signal transmitted by second beatable signal source 50 collectively have a first phase relationship with the phase reference signal transmitted by phase reference signal source 80. As described above, the first phase relationship may be quantified by a first source phase difference between a first source beat signal and the phase reference signal. The first source beat signal is obtained by summing the first beatable signal and the second beatable signal and demodulating the resulting sum signal. Additionally at source location 32, the first beatable signal transmitted by first beatable signal source 30 and the third beatable signal transmitted by third beatable signal source 60 collectively have a second phase relationship with the phase reference signal transmitted by phase reference signal source 80. As described above, the second phase relationship may be quantified by a second source phase difference between a second source beat signal and the phase reference signal. The second source beat signal is obtained by summing the first beatable signal and the third beatable signal and demodulating the resulting sum signal. Data representing the first phase relationship and the second phase relationship, e.g., the first source phase difference and the second source phase difference, respectively, is provided to receiver 100, where it stored in the processor 101.

In this embodiment of system 14, receiver 100 determines the direction angle $\phi_1$ of source location 32 relative to first reference direction RD1 and the direction angle $\phi_2$ of source location 32 relative to second reference direction RD2 as follows. Receiver 100 receives the first beatable signal, the second beatable signal, the third beatable signal, and the modulated signal that includes the phase reference signal. The receiver sums the first beatable signal and the second beatable signal to generate a first sum signal and demodulates the first sum signal to extract a first beat signal. The receiver subjects the modulated signal to AM demodulation to recover the phase reference signal. The receiver measures a first phase difference $\Delta\Phi_1$ between the first beat signal and the phase reference signal. Processor 101 processes first phase difference $\Delta\Phi_1$ in a manner similar to that described above to determine the first direction angle $\phi_1$ of phase reference signal source 80 relative to first reference direction RD1. The determination is based in part on the first phase relationship and the first positional relationship.

Receiver 100 also sums the first beatable signal and the third beatable signal to generate a second sum signal, and demodulates the second sum signal to extract a second beat signal. The receiver measures a second phase difference $\Delta\Phi_2$ between the second beat signal and the phase reference signal. Processor 101 processes second phase difference $\Delta\Phi_2$ in a manner similar to that described above to determine the second direction angle $\phi_2$ of the phase reference signal source 80 relative to second reference direction RD2. The determination is based in part on the second phase relationship and the second positional relationship.

Determining second direction angle $\phi_2$ in addition to first direction angle $\phi_1$ eliminates the ambiguity with which the bearing of source location 32 from receiver location 34 is determined in a two-dimensional world, and reduces the ambiguity with which the bearing is determined in a three-dimensional world, as described above with reference to FIGS. 7A and 7B.

In a system based on system 14 for determining the bearing of source location 32 from receiver location 34 in accordance with an eleventh embodiment of the invention, the phase reference signal is single-frequency signal having the same frequency $\omega_{TS}$ as the phase reference signal of the tenth embodiment. In this eleventh embodiment, phase reference signal source 80 transmits the phase reference signal directly. Since the phase reference signal is transmitted directly, receiver 100 does not subject the received phase reference signal to AM demodulation.

Figure 9C:
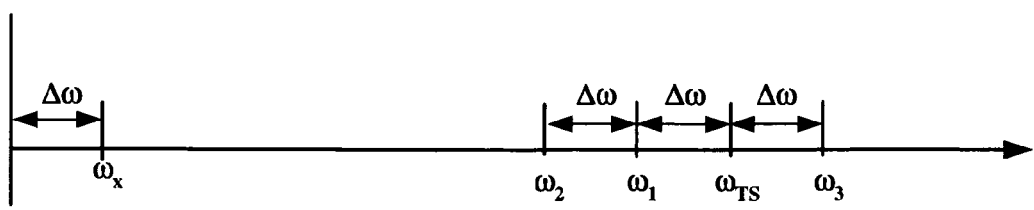
FIG. 9C is a schematic drawing showing the spectrum of the signals in the system shown in FIG. 9A in accordance with a twelfth embodiment of the invention.

FIG. 9C is a schematic drawing showing the spectrum of the signals in a system based on system 14 shown FIG. 9A in accordance with a twelfth embodiment of the invention. In this embodiment, the phase reference signal is a single-frequency signal having a phase reference frequency $\omega_{TS}$ greater than the first frequency and differs from the first frequency by a frequency difference $\Delta\omega$ equal to a harmonic of the frequency difference $\Delta\omega$ between the first frequency $\omega_1$ of the first beatable signal transmitted by first beatable signal source 30 and the second frequency $\omega_2$ of second beatable signal transmitted by second beatable signal source 50. In this embodiment, phase reference signal source 80 transmits the phase reference signal directly.

In the example shown, the second frequency $\omega_2$ is less than the first frequency $\omega_1$ and differs from the first frequency $\omega_1$ by a frequency difference $\Delta\omega$. The third frequency $\omega_3$ is greater than the phase reference frequency $\omega_{TS}$ and differs from the phase reference frequency $\omega_{TS}$ by frequency difference $\Delta\omega$. Thus, the first frequency $\omega_1$, the second frequency $\omega_2$, the third frequency $\omega_3$, and the phase reference frequency $\omega_{TS}$ differ from each other by a harmonic of frequency difference $\Delta\omega$. The beat signals generated in this embodiment have respective frequencies that are harmonics of frequency difference $\Delta\omega$.

A calibrating signal having a frequency $\omega_X$ equal to frequency difference $\Delta\omega$ is used to calibrate the frequencies of the beatable signals and the phase reference signal in a manner similar to that described above with reference to FIG. 6B.

In this twelfth embodiment of system 14, receiver 100 determines the direction angle $\phi_1$ of source location 32 relative to first reference direction RD1 and the direction angle $\phi_2$ of source location 32 relative to second reference direction RD2 as follows. Receiver 100 receives the first beatable signal, the second beatable signal, the third beatable signal, and the phase reference signal. The receiver sums the first beatable signal and the second beatable signal to generate a first sum signal, and demodulates the first sum signal to extract a first beat signal. The receiver sums the first beatable signal and the phase reference signal to generate a second sum signal, and demodulates the second sum signal to extract a second beat signal. The receiver measures a first phase difference $\Delta\Phi_1$ between the first beat signal and the second beat signal. Processor 101 processes measured first phase difference $\Delta\Phi_1$ in a manner similar to that described above to determine the first direction angle $\phi_1$ of source location 32 relative to first reference direction RD1. The determination is based in part on the first phase relationship and the first positional relationship.

Receiver 100 sums the first beatable signal and the third beatable signal to generate a third sum signal, and demodulates the third sum signal to extract a third beat signal. The receiver measures a second phase difference $\Delta\Phi_2$ between the third beat signal and the second beat signal. Processor 101 processes measured second phase difference $\Delta\Phi_2$ in a manner similar to that described above to determine the second direction angle $\phi_2$ of source location 32 relative to second reference direction RD2. The determination is based in part on the second phase relationship and the second positional relationship.

Determining second direction angle $\phi_2$ in addition to first direction angle $\phi_1$ reduces the ambiguity with which receiver 100 determines the bearing of source location 32 in the manner described above with reference to FIG. 9A.

Figure 10A:
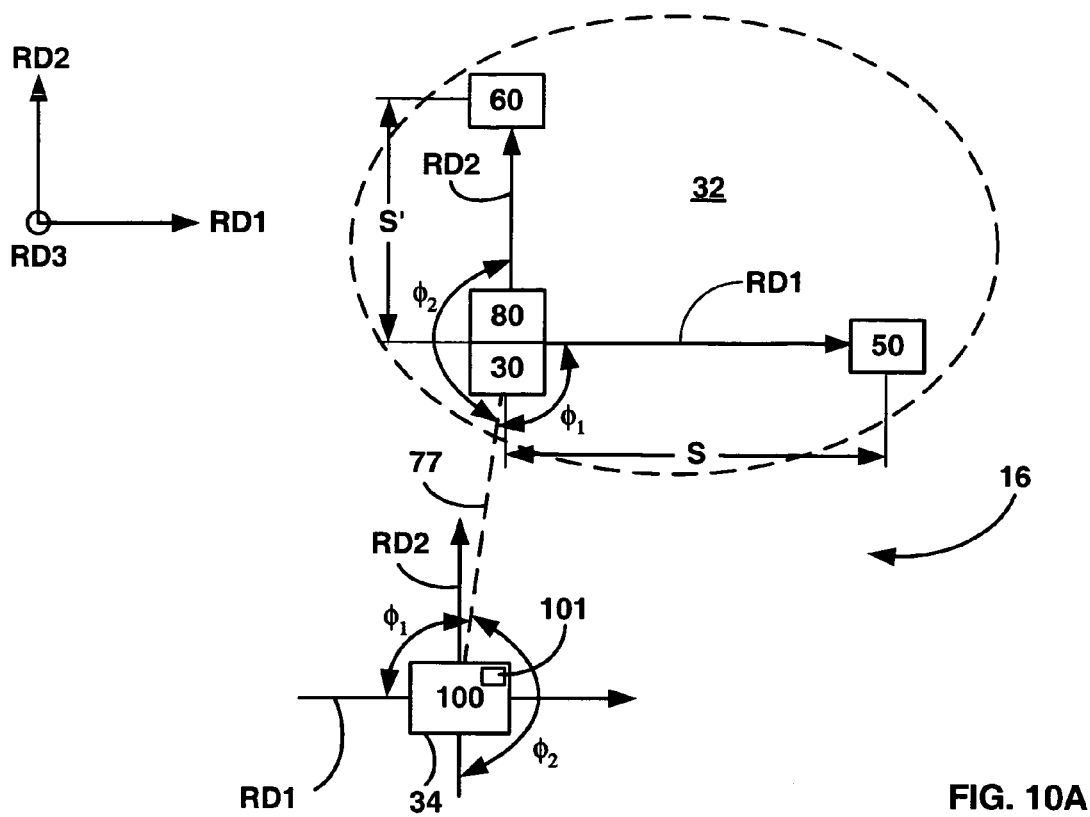
FIGS. 10A and 10B are schematic drawings showing a system for determining the bearing of a source location from a receiver location in accordance with a thirteenth embodiment of the invention.
Figure 10B:
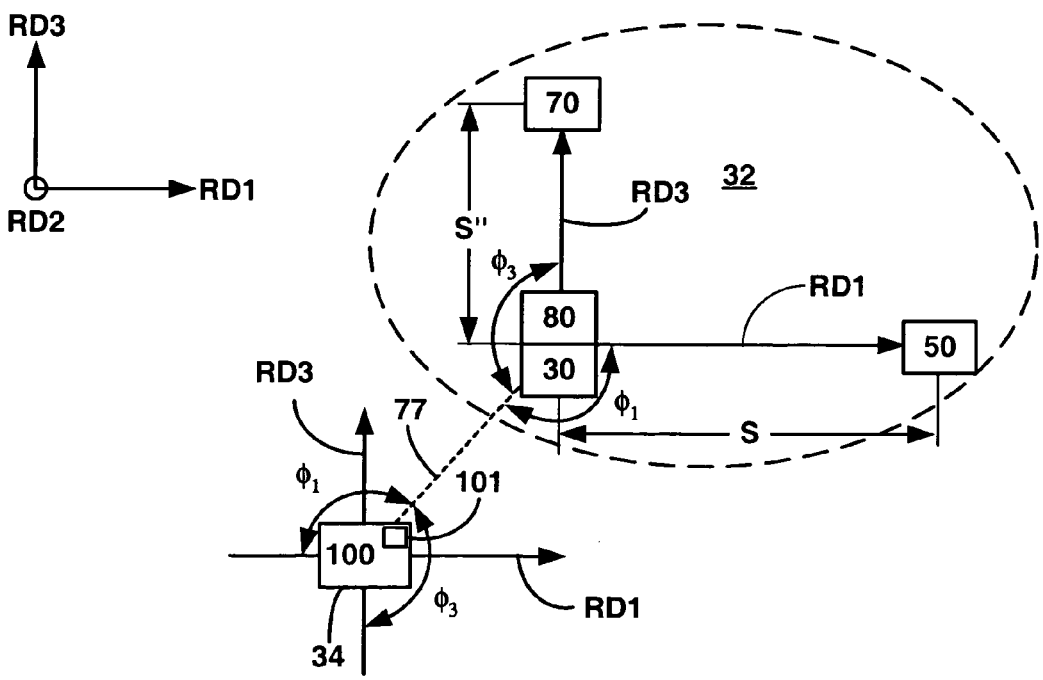

FIGS. 10A and 10B schematically illustrate a system 16 for determining the bearing of source location 32 from receiver location 34 accordance with a thirteenth eleventh embodiment of the invention. In system 16, receiver 100 unambiguously determines the bearing of source location 32 from the receiver location 34 in worlds having three or fewer dimensions. The ambiguity with which the bearing is determined is eliminated by defining three reference directions that are non-parallel and do not lie in a single plane and determining a respective direction angle of source location 32 from receiver location 34 relative to each reference direction.

FIG. 10A is a plan view showing an example of system 16 and FIG. 10B is an elevational view of the example of system 16 shown in FIG. 10A. In system 16, receiver 100 determines a respective direction angle of source location 32 from receiver location 34 relative to each of three reference directions RD1, RD2 and RD3. In system 16, receiver 100 determines a first direction angle $\phi_1$ of source location 32 with respect to first reference direction RD1, a second direction angle $\phi_2$ of source location 32 with respect to second reference direction RD2 and a third direction angle $\phi_3$ of source location 32 with respect to third reference direction RD3. System 16 uses first direction angle $\phi_1$, second direction angle $\phi_2$ and third direction angle $\phi_3$ to determine unambiguously the bearing of source location 32 from receiver location 34 in a world with three or fewer dimensions.

In the example of system 16 shown, first reference direction RD1, second reference direction RD2 and third reference direction RD3 are mutually orthogonal. In FIG. 10A, third reference direction RD3 extends towards the observer from the plane defined by first reference direction RD1 and second reference direction RD2. In FIG. 10B, second reference direction RD2 extends away from the observer from the plane defined by first reference direction RD1 and third reference direction RD3. In other embodiments, first reference direction RD1, second reference direction RD2 and third reference direction RD3 are not mutually orthogonal, but are not coplanar.

In system 16, located at source location 32 are first beatable signal source 30, second beatable signal source 50 and phase reference signal source 80 arranged described above with reference to FIG. 6A, i.e., first beatable signal source 30 and phase reference signal source 80 are collocated at the first position. Additionally located at source location 32 are a third beatable signal source 60 located at a third position and a fourth beatable signal source 70 located at a fourth position. Third beatable signal source 60 is spatially offset from phase reference signal source 80 by a distance S' in second reference direction RD2 (FIG. 10A), orthogonal to first reference direction RD1. Fourth beatable signal source 70 is spatially offset from phase reference signal source 80 by a distance S" in third reference direction RD3 (FIG. 10B). In one embodiment, distances S, S' and S" are equal. In another embodiment, two of the distances S, S' and S" are equal.

First beatable signal source 30, second beatable signal source 50 and phase reference signal source 80 have a first positional relationship quantified by distance S and first reference direction RD1, as described above with reference to FIG. 6A. First beatable signal source 30, third beatable signal source 60 and phase reference signal source 80 have a second positional relationship quantified by distance S, second reference direction RD2 and the angle between the first reference direction and the second reference direction. First beatable signal source 30, fourth beatable signal source 70 and phase reference signal source 80 have a third positional relationship quantified by distance S", third reference direction RD3 and the angle between the first reference direction and the third reference direction. Data representing the first, second and third positional relationships is provided to receiver 100, where it stored in processor 101.

Figure 10C:
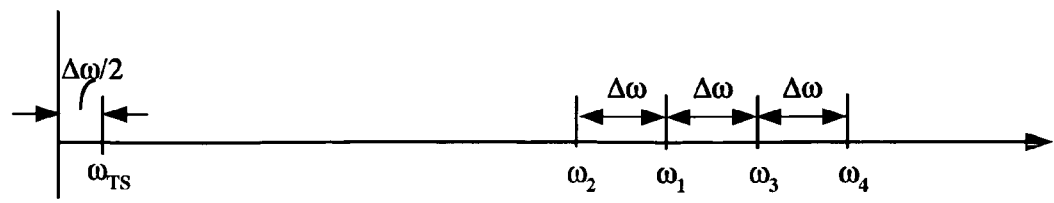
FIG. 10C is a schematic drawing showing the spectrum of the signals in the system shown in FIG. 10A in accordance with a fourteenth embodiment of the invention.

FIG. 10C is a schematic drawing showing the spectrum of the signals in an example of system 16 shown in FIG. 10A. The first frequency $\omega_1$ of the first beatable signal transmitted by first beatable signal source 30 and the second frequency $\omega_2$ of the second beatable signal transmitted by second beatable signal source 50 differ by a frequency difference $\Delta\omega$. Third beatable signal source 60 transmits a third beatable signal having a third frequency $\omega_3$. Fourth beatable signal source 70 transmits a fourth beatable signal having a fourth frequency $\omega_4$. The fourth frequency $\omega_4$ is greater than the third frequency $\omega_3$ and differs from the third frequency $\omega_3$ by a frequency difference equal to frequency difference $\Delta\omega$. The third frequency $\omega_3$ is greater than the second frequency $\omega_2$ and differs from the first frequency $\omega_1$ by a frequency difference $\Delta\omega$.

In the embodiment of system 16 shown in FIGS. 10A-10C, the phase reference signal is a square wave or a cosine wave having a frequency $\omega_{TS}$ equal to a harmonic of frequency difference $\Delta\omega$. In the example shown, the phase reference signal is a square wave having a frequency $\omega_{TS}$ equal to one-half of frequency difference $\Delta\omega$. Phase reference signal source 80 transmits the phase reference signal as a modulated signal obtained by modulating the amplitude of a carrier signal (not shown) with the phase reference signal. A calibrating signal having a frequency $\omega_X$ equal to frequency difference $\Delta\omega$ can be used to calibrate the frequencies of the beatable signals and the phase reference signal in a manner similar to that described above with reference to FIG. 6B.

At source location 32, the first beatable signal transmitted by first beatable signal source 30 and the second beatable signal transmitted by second beatable signal source 50 collectively have a first phase relationship with the phase reference signal transmitted by phase reference signal source 80. As described above, the first phase relationship may be quantified by a first source phase difference between a first source beat signal and the phase reference signal. The first source beat signal is obtained by summing the first beatable signal and the second beatable signal and demodulating the resulting sum signal, as described above. Additionally at source location 32, the first beatable signal transmitted by first beatable signal source 30 and the third beatable signal transmitted by third beatable signal source 60 collectively have a second phase relationship with the phase reference signal transmitted by phase reference signal source 80. The second phase relationship may be quantified by a second source phase difference between a second source beat signal and the phase reference signal, in a manner similar to that described above. The second source beat signal is obtained by summing the first beatable signal and the third beatable signal and demodulating the resulting sum signal. Finally at source location 32, the first beatable signal transmitted by first beatable signal source 30 and the fourth beatable signal transmitted by fourth beatable signal source 70 collectively have a third phase relationship with the phase reference signal transmitted by phase reference signal source 80. The third phase relationship may be quantified by a third source phase difference between a third source beat signal and the phase reference signal, in a manner similar to that described above. The third source beat signal is obtained by summing the first beatable signal and the fourth beatable signal and demodulating the resulting sum signal. Data representing the first, second and third phase relationships, e.g., the first, second and third source phase differences, respectively, is provided to receiver 100, where it is stored in processor 101.

In this embodiment of system 16, receiver 100 determines the direction angle $\phi_1$ of source location 32 relative to first reference direction RD1, the direction angle $\phi_2$ of source location 32 relative to second reference direction RD2 and the direction angle $\phi_3$ of source location 32 relative to third reference direction RD3 as follows. Receiver 100 receives the first beatable signal, the second beatable signal, third beatable signal, the fourth beatable signal and the modulated signal that includes the phase reference signal. The receiver sums the first beatable signal and the second beatable signal to generate a first sum signal, and demodulates the first sum signal to extract a first beat signal. The receiver subjects the modulated signal to AM demodulation to recover the phase reference signal. The receiver measures a first phase difference $\Delta\Phi_1$ between the first beat signal and the phase reference signal. Processor 101 processes measured first phase difference $\Delta\Phi_1$ in a manner similar to that described above to determine the first direction angle $\phi_1$ of source location 32 relative to first reference direction RD1. The determination is based in part on the first phase relationship and the first positional relationship.

Receiver 100 also sums the first beatable signal and the third beatable signal to generate a second sum signal, and demodulates the second sum signal to extract a second beat signal. The receiver measures a second phase difference $\Delta\Phi_2$ between the second beat signal and the phase reference signal. Processor 101 processes measured second phase difference $\Delta\Phi_2$ in a manner similar to that described above to determine the second direction angle $\phi_2$ of source location 32 relative to second reference direction RD2. The determination is based in part on the second phase relationship and the second positional relationship.

Receiver 100 also sums the first beatable signal and the fourth beatable signal to generate a third sum signal, and demodulates the third sum signal to extract a third beat signal. The receiver measures a third phase difference $\Delta\Phi_3$ between the third beat signal and the phase reference signal. Processor 101 processes measured third phase difference $\Delta\Phi_3$ in a manner similar to that described above to determine the third direction angle $\phi_3$ of the phase reference signal source 80 relative to third reference direction RD3. The determination is based in part on the third phase relationship and the third positional relationship.

In a three-dimensional world, first direction angle $\phi_1$, second direction angle $\phi_2$ and third direction angle $\phi_3$ collectively enable receiver 100 to determine the bearing of source location 32 unambiguously. Line 77 angled at first direction angle $\phi_1$ relative to first reference direction RD1 forms a first cone (not shown) when it is rotated about the first reference direction. Likewise, line 77 angled at second direction angle $\phi_2$ relative to second reference direction RD2 forms a second cone (not shown) when it is rotated about the second reference direction, and line 77 angled at third direction angle $\phi_3$ relative to third reference direction RD3 forms a third cone (not shown) when it is rotated about the third reference direction. The first cone, the second cone and the third cone intersect at line 77. The bearing of source location 32 from receiver location 34 in the three-dimensional world is thus the direction in which line 77 extends from receiver 100.

Thus, in system 16, receiver 100 unambiguously determines the bearing of source location 32 in a world having three or fewer dimensions. System 16 may be used with a satellite transceiver system (not shown) to reduce the power requirements of the transmitter in the satellite so that the satellite can be lighter and, therefore, less expensive to put into earth orbit. In an exemplary application of system 16, receiver location 34 is at the earth-based transceiver and source location 32 is at the satellite, where first beatable signal source 30, second beatable signal source 50, third beatable signal source 60, fourth beatable signal source 70, and phase reference signal source 80 of system 16 are all located spatially offset from one another in the first reference direction RD1, second reference direction RD2, and third reference direction RD3, as described above. Receiver 100 determines the bearing of source location 32, i.e., the bearing of the satellite, and the earth-based transceiver located at the receiver location uses the bearing determined by the receiver to direct its antenna towards the satellite. The main satellite transmitter can be turned off when not operational as long as the beatable signal sources and the phase reference signal source of system 16 located on the satellite remain turned on to allow receiver 100 to continue to provide the bearing of the satellite to the earth-based transceiver to enable the transceiver to aim its antenna towards the satellite.

In another exemplary application of system 16, receiver 100 is located on an UAV and first beatable signal source 30, second beatable signal source 50, third beatable signal source 60, fourth beatable signal source 70, and phase reference signal source 80 are parts of a transceiver carried by a soldier in combat. The UAV-based receiver 100 can determine the bearing of the transceiver carried by the soldier in the manner described above. An enemy intercepting the beatable signals and the phase reference signal cannot determine the location of the soldier, since the enemy does not have the data defining the positional relationships of the signal sources and the phase relationships of the signals. The UAV, on the other hand, has this data and can therefore determine the bearing of the soldier. The UAV can transmit information to the soldier using a highly-directional signal aimed towards the soldier in accordance with the bearing. Information transmitted to the soldier using the highly-directional signal is more secure than information transmitted to the soldier using an omni-directional signal. This allows less computationally-intensive encryption to used to transmit sensitive information to the soldier.

In a system based on system 15 for determining the bearing of source location 32 from receiver location 34 in accordance with a fourteenth embodiment of the invention, the phase reference signal is single-frequency signal having the same frequency $\omega_{TS}$ as the phase reference signal of the thirteenth embodiment. In this fourteenth embodiment, phase reference signal source 80 transmits the phase reference signal directly. Since the phase reference signal is transmitted directly, receiver 100 does not subject the received phase reference signal to amplitude demodulation.

Figure 10D:
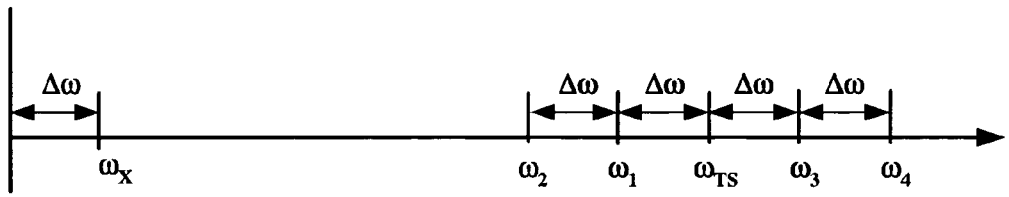
FIG. 10D is a schematic drawing showing the spectrum of the signals in the system shown in FIG. 10A in accordance with a fifteenth embodiment of the invention.

FIG. 10D is a schematic drawing showing the spectrum of the signals in a system based on system 16 shown in FIG. 10A in accordance with a fifteenth embodiment of the invention. In this embodiment, the phase reference signal is single-frequency signal having a phase reference frequency $\omega_{TS}$ and is directly transmitted by phase reference signal source 80. Second frequency $\omega_2$ is less than first frequency $\omega_1$ and differs from first frequency $\omega_1$ by a frequency difference $\Delta\omega$. Phase reference frequency $\omega_{TS}$ is greater than second frequency $\omega_2$ and differs from first frequency $\omega_1$ by frequency difference $\Delta\omega$. Third frequency $\omega_3$ is greater than phase reference frequency $\omega_{TS}$ and differs from phase reference frequency $\omega_{TS}$ by frequency difference $\Delta\omega$. Fourth frequency $\omega_4$ is greater than third frequency $\omega_3$ and differs from third frequency $\omega_3$ by frequency difference $\Delta\omega$.

Thus, first frequency $\omega_1$, second frequency $\omega_2$, third frequency $\omega_3$, fourth frequency $\omega_4$ and phase reference frequency $\omega_{TS}$ differ from each other by a harmonic of frequency difference $\Delta\omega$. The beat signals have a frequency equal to a harmonic of one-half of the frequency difference. A calibrating signal having a frequency $\omega_X$ equal to frequency difference $\Delta\omega$ is used to calibrate the frequencies of the beatable signals and the phase reference signal in the manner similar to that described above with reference to FIG. 6B.

In this embodiment of system 16, receiver 100 determines the first direction angle $\phi_1$ of source location 32 relative to first reference direction RD1, the second direction angle $\phi_2$ of source location 32 relative to second reference direction RD2, and the third direction angle $\phi_3$ of source location 32 relative to third reference direction RD3 as follows. Receiver 100 receives the first beatable signal, the second beatable signal, third beatable signal, the fourth beatable signal, and the phase reference signal. The receiver sums the first beatable signal and the second beatable signal to generate a first sum signal and demodulates the first sum signal to extract a first beat signal. Similarly, the receiver obtains a second beat signal from the first beatable signal and the phase reference signal, a third beat signal from the first beatable signal and the third beatable signal, and a fourth beat signal from the first beatable signal and the fourth beatable signal. Receiver 100 measures a first phase difference $\Delta\Phi_1$ between the first beat signal and the second beat signal, a second phase difference $\Delta\Phi_2$ between the third beat signal and the second beat signal, and a third phase difference $\Delta\Phi_3$ between the fourth beat signal and the second beat signal.

Processor 101 processes measured first phase difference $\Delta\Phi_1$ to determine first direction angle $\phi_1$, measured second phase difference $\Delta\Phi_2$ to determine second direction angle $\phi_2$, and measured third phase difference $\Delta\Phi_3$ to determine third direction angle $\phi_3$ of source location 32 relative to first reference direction RD1, second reference direction RD2 and third reference direction RD3, respectively. The processing is performed in a manner similar to that described above.

Determining first direction angle $\phi_1$, second direction angle $\phi_2$, and third direction angle $\phi_3$ enables receiver 100 to determine unambiguously the bearing of source location 32 in a world having three or fewer dimensions, as described above with reference to FIGS. 10A and 10B.

Figure 11:
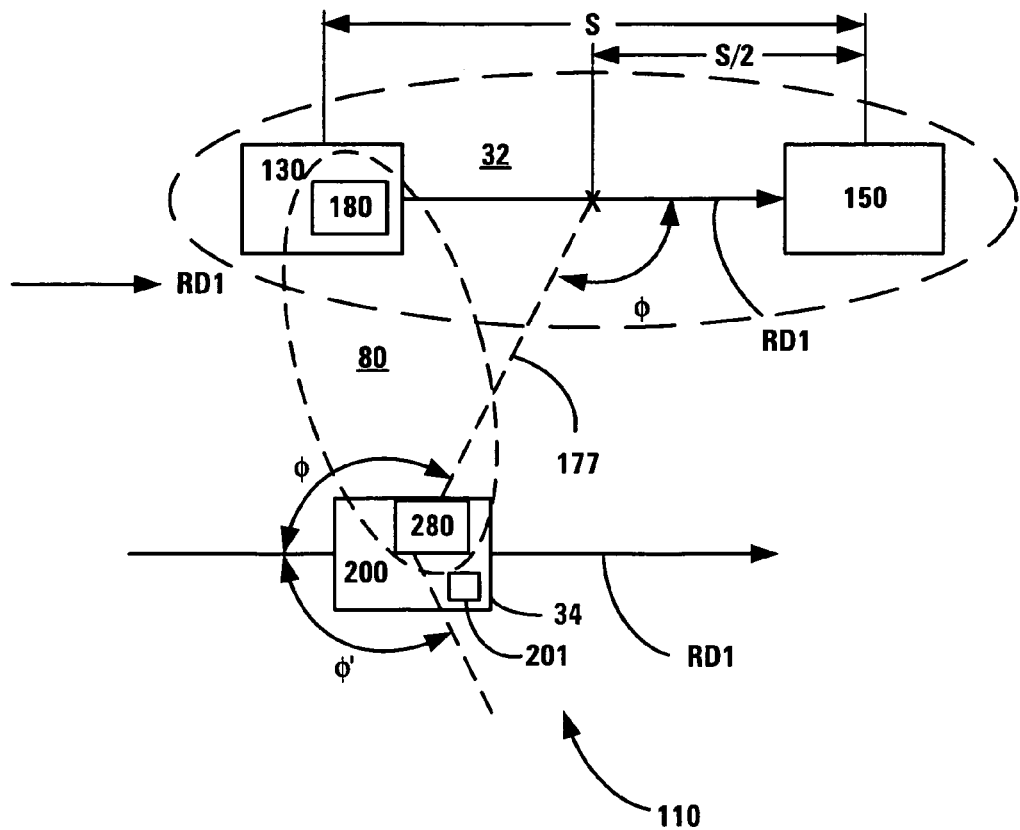
FIG. 11 is a schematic drawing showing a system for determining the bearing of a source location from a receiver location in accordance with a sixteenth embodiment of the invention.

FIG. 11 is a schematic drawing of a system 110 for determining the bearing of source location 32 from receiver location 34 in accordance with a sixteenth embodiment of the invention. In this embodiment, the phase reference signal source is distributed between the receiver and the first beat signal source, and no phase reference signal is transmitted to the receiver. This provides additional security.

Similar to system 10 described above with reference to FIG. 5A, the example of system 110 shown in FIG. 11 has two beatable signal sources, so the bearing of source location 32 is determined ambiguously in a world having two or more dimensions. System 110 may be expanded to include more beatable signal sources in accordance with the teachings set forth above to reduce the ambiguity with which the bearing of the source location is determined.

In system 110, a first beatable signal source 130 and second beatable signal source 150 are located at source location 32 and a phase-sensitive receiver 200 is located at receiver location 34. Receiver 200 includes a processor 201. First beatable signal source 130 is located at a first position and second beatable signal source 150 is located at a second position. Second beatable signal source 150 is spatially offset from first beatable signal source 130 by a distance S in a first reference direction RD1. First beatable signal source 130 and second beatable signal source 150 have a positional relationship quantified by distance and first reference direction RD1. Data representing the positional relationship is provided to receiver 200, where it is stored in processor 201.

System 110 additionally has a phase reference signal source 80 distributed between first beatable signal source 130 and receiver 200. Phase reference signal source 80 is composed of a source clock 180 and a receiver clock 280. Source clock 180 constitutes part of first beatable signal source 130 and generates an instance of a phase reference signal local to first beatable signal source 130. Alternatively, source clock 180 constitutes part of second beatable signal source 150. Receiver clock 280 constitutes part of receiver 200 and generates an instance of the phase reference signal local to receiver 200.

The phase reference signal has a phase reference frequency $\omega_{TS}$. The instance of phase reference signal generated by source clock 180 and the instance of the phase reference signal generated by receiver clock 280 are each a square wave or a cosine wave having the phase reference frequency. The instances of the phase reference frequency are typically equal in frequency, but alternatively, one may be a harmonic of the other.

First beatable signal source 130 transmits a first beatable signal having a first frequency $\omega_1$. Second beatable signal source 150 transmits a second beatable signal having a second frequency $\omega_2$. First frequency $\omega_1$ and second frequency $\omega_2$ differ by a harmonic of the phase reference frequency $\omega_{TS}$. In one example, the first frequency and the second frequency differ by twice the phase reference frequency.

The first beatable signal as transmitted by first beatable signal source 130 and the second beatable signal as transmitted by second beatable signal source 150 collectively have a phase relationship with the phase reference signal. The phase relationship may be quantified by a source phase difference between a beat signal and the phase reference signal. The beat signal is obtained by summing the first beatable signal and the second beatable signal and demodulating the resulting sum signal, as described above. Data representing the phase relationship, e.g., data representing the source phase difference, is provided to receiver 200, where it stored in processor 201.

At the beginning of an operation, receiver 200 is provided with the data representing the positional relationship and the phase relationship, and receiver clock 280 is synchronized with source clock 180. Source clock 180 and receiver clock 280 are sufficiently stable over a time longer than the maximum planned duration of the operation that they maintain synchronization between their respective instances of the phase reference signal within a specified tolerance. The specified tolerance is that which causes the error in the direction angle determined by receiver 200 to be less than a specified maximum.

In system 110, receiver 200 determines the direction angle $\phi$ of source location 32 relative to the first reference direction RD1 as follows. Receiver 200 receives the first beatable signal and the second beatable signal. The receiver sums the first beatable signal and the second beatable signal to generate a sum signal, and demodulates the sum signal to extract a beat signal. The receiver measures the phase difference $\Delta\Phi$ between the beat signal and the instance of the phase reference signal provided by receiver clock 280. Processor 201 processes measured phase difference $\Delta\Phi$ in the manner described above to determine the direction angle $\phi$ of source location 32 relative to the first reference direction RD1. The processor additionally determines the bearing of source location 32 from the direction angle. The determination is based in part on the phase relationship and the positional relationship.

The bearing determined by receiver 200 in system 110 is subject to the ambiguity described above with reference to FIG. 5A. As noted above, the ambiguity with which system 110 determines the bearing in worlds having two or more dimensions can be reduced or eliminated by modifying system 110 to include additional spatially-offset beatable signal sources in a manner similar to the way that system 10 shown FIG. 5A is modified as described above.

This disclosure describes the invention in detail using illustrative embodiments. However, the invention defined by the appended claims is not limited to the precise embodiments described.

We claim:

1. A system for determining the bearing of a source location from a receiver location, the system comprising:
   a phase reference signal source operable to generate a phase reference signal;
   at the source location, a first beatable signal source operable to transmit a first beatable signal and a second beatable signal source spatially offset from the first beatable signal source in a reference direction, the second beatable signal source operable to transmit a second beatable signal differing in frequency from the first beatable signal by a frequency difference, the first beatable signal and the second beatable signal collectively having a phase relationship with the phase reference signal; and at the receiver location, a receiver structured to receive the first beatable signal and the second beatable signal and operable to determine a direction angle, relative to the reference direction, of the source location from the receiver location, the receiver performing operations comprising:

measuring a phase difference between a beat signal and one of (a) the phase reference signal, and (b) an additional beat signal, the beat signal obtained by a process comprising summing the first beatable signal and the second beatable signal, the additional beat signal obtained by a process comprising summing the first beatable signal and the phase reference signal, and determining the direction angle from the measured phase difference.

2. The system of claim 1, in which: the phase reference signal source transmits the phase reference signal; and the receiver is structured additionally to receive the transmitted phase reference signal.

3. The system of claim 2, in which the phase reference signal has a frequency equal to one-half of the frequency difference.

4. The system of claim 3, in which the receiver is operable to sum the first beatable signal and the second beatable signal to obtain a sum signal and to demodulate the sum signal to extract the beat signal.

5. The system of claim 3, in which:
the phase reference signal source transmits the phase reference signal by transmitting a modulated signal obtained by modulating a carrier signal with the phase reference signal;
the receiver receives the phase reference signal by receiving the modulated signal; and
the receiver is additionally operable to demodulate the modulated signal to recover the phase reference signal.

6. The system of claim 5, in which the receiver is operable to sum the first beatable signal and the second beatable signal to obtain a sum signal and to demodulate the sum signal to extract the beat signal.

7. The system of claim 2, in which:
the first beatable signal source and the phase reference signal source are collocated;
the first beatable signal, the second beatable signal and the phase reference signal mutually differ in frequency by harmonically-related frequency differences; and
the receiver is operable to:
sum the first beatable signal and the second beatable signal to obtain a first sum signal and to demodulate the first sum signal to extract the beat signal, and
sum the first beatable signal and the phase reference signal to obtain an additional sum signal and to demodulate the additional sum signal to extract the additional beat signal.

8. The system of claim 2, in which the phase reference signal source is collocated with the first beatable signal source.

9. The system of claim 2, in which:
the reference direction, the direction angle, the phase reference signal, the phase reference signal source, the frequency difference, the beat signal, the additional beat signal, the phase difference, the phase relationship and the positional relationship are respectively a first reference direction, a first direction angle, a first phase reference signal, a first phase reference signal source, a first frequency difference, a first beat signal, a first additional beat signal, a first phase difference, a first phase relationship and a first positional relationship; and the receiver is operable to determine a second direction angle, relative to a second reference direction, of the source location from the receiver location and to determine, from the first direction angle and the second direction angle, the bearing of the source location relative to the first reference direction.

10. The system of claim 9, in which:
the phase reference signal is a first phase reference signal and has a first phase reference frequency;
the phase reference signal source comprises a first phase reference signal generator and a second signal generator, the first reference signal generator transmitting the first phase reference signal, the second phase reference signal source operable to transmit a second phase reference signal at a second phase reference frequency;
at the source location, the system additionally comprises a third beatable signal source spatially offset from the first beatable signal source in a second reference direction, the third beatable signal source, the first phase reference signal source and the phase reference signal source having a second positional relationship, the third beatable signal source operable to transmit a third beatable signal having a third frequency greater than the second frequency and differing from the first frequency by a second frequency difference harmonically related to the second phase reference frequency, the first beatable signal and third beatable signal collectively having a second phase relationship with the second phase reference signal; and the receiver is structured additionally to receive the third beatable signal and the second phase reference signal, and additionally performs operations comprising: measuring a second phase difference between a second beat signal and one of (a) the second phase reference signal, and (b) a second additional beat signal, the second beat signal obtained by a process comprising summing the first beatable signal and the third beatable signal, the second additional beat signal obtained by a process comprising summing the first beatable signal and the phase reference signal, and
determining the second direction angle from the second measured phase difference.

11. The system of claim 9, in which:
at the source location, the system additionally comprises:
a third beatable signal source spatially offset from the phase reference signal source in a second reference direction orthogonal to the first reference direction, the third beatable signal source operable to transmit a third beatable signal having a third frequency, and
a fourth beatable signal source spatially offset from the phase reference signal source in a direction opposite the second reference direction, the fourth beatable signal source operable to transmit a fourth beatable signal having a fourth frequency, the fourth frequency differing from the third frequency by a second frequency difference, the third beatable signal and the fourth beatable signal collectively having a second phase relationship with the phase reference signal; and
the receiver is structured additionally to receive the third beatable signal and the fourth beatable signal, and performs additional operations comprising: measuring a second phase difference between a second beat signal obtained by a process comprising summing the first beatable signal and the third beatable signal and one of (a) the phase reference signal, and (b) the additional beat signal, and determining the second direction angle from the measured second phase difference.

12. The system of claim 9, in which:

the phase reference signal source is collocated with the first beatable signal source;

at the source location, the system additionally comprises a third beatable signal source spatially offset from the first beatable signal source in a second reference direction, non-parallel to the first reference direction, the third beatable signal source operable to transmit a third beatable signal having a third frequency, the first beatable signal and the third beatable signal collectively having a second phase relationship with the phase reference signal;

the receiver is structured additionally to receive the third beatable signal, and additionally performs operations comprising:

measuring a second phase difference between a second beat signal and one of (a) the phase reference signal, and (b) the additional beat signal, the second beat signal obtained by a process comprising summing the first beatable signal and the third beatable signal and determining the second direction angle from the second measured phase difference.

13. The system of claim 12, in which:

the third frequency differs from the second frequency, and additionally differs from the first frequency by a second frequency difference harmonically-related to the first frequency difference;

the phase reference signal has a frequency harmonically related to the first frequency difference; and, the receiver measures the second phase difference between the second beat signal and the phase reference signal.

14. The system of claim 12, in which:

the phase reference signal has a phase reference frequency;

the third frequency and the phase reference frequency differ from the second frequency and differ from the first frequency by different harmonics of the first frequency difference, and the receiver measures the second phase difference between the second beat signal and the additional beat signal.

15. The system of claim 12, in which the second reference direction is orthogonal to the first reference direction.

16. The system of claim 12, in which:

the system additionally comprises, at the source location, a fourth beatable signal source spatially offset from the first beatable signal source in a third reference direction, non-coplanar with the first reference direction and the second reference direction, the fourth beatable signal source operable to transmit a fourth beatable signal having a fourth frequency, the first beatable signal and the third beatable signal collectively having a second phase relationship with the phase reference signal; the first beatable signal and the fourth beatable signal collectively having a third phase relationship with the phase reference signal; and the receiver is structured additionally to receive the fourth beatable signal, and is additionally operable to determine a third direction angle, relative to the third reference direction, of the source position from the receiver position, and to determine, from the first direction angle, the second direction angle and the third direction angle, the bearing of the source position from the receiver position by performing operations comprising:

measuring a third phase difference between a third beat signal and one of (a) the phase reference signal, and (b) the additional beat signal, the third beat signal obtained by a process comprising summing the first beatable signal and the fourth beatable signal and determining the third direction angle from the third measured phase difference.

17. The system of claim 16, in which:

the third frequency and the fourth frequency differ from the second frequency and differ from the first frequency by different harmonics of the first frequency difference;

the phase reference signal has a frequency harmonically-related to the first frequency difference; and the receiver measures the third phase difference between the third beat signal and the phase reference signal.

18. The system of claim 16, in which:

the phase reference signal has a phase reference frequency; and the phase reference frequency, the third frequency and the fourth frequency differ from the second frequency and differ from the first frequency by different harmonics of the first frequency difference; and the receiver measures the third phase difference between the third beat signal and the additional beat signal.

19. The system of claim 16, in which the first reference direction, the second reference direction and the third reference direction are mutually orthogonal.

20. The system of claim 1, in which:

the phase reference signal source comprises a source clock and a receiver clock, each of the source clock and the receiver clock operable to generate a respective instance of the phase reference signal;

the source clock constitutes part of the first beatable signal source, a beat signal obtained from the first beatable signal as transmitted by the first beatable signal source and the second beatable signal as transmitted by the second beatable signal source having a phase relationship with the instance of the phase reference signal generated by the source clock; and the receiver clock constitutes part of the receiver and provides the instance of the phase reference signal thereto.

21. The system of claim 1, in which:

the first beatable signal source and the second beatable signal source have a positional relationship; and the receiver determines the direction angle based in part on the phase relationship and the positional relationship.

22. A method of determining the bearing, relative to a reference direction, of a source location from a receiving location, the method comprising:

receiving at the receiving location a first beatable signal transmitted from a first position at the source location, the first beatable signal having a first frequency;

receiving at the receiving location a second beatable signal transmitted from a second position at the source location, the second position spatially offset from the first position in the reference direction, the second beatable signal having a second frequency differing from the first frequency by a frequency difference;

determining from the first beatable signal and the second beatable signal received at the receiving location a direction angle, relative to the reference direction, of the source location from the receiving location, the determining comprising:

measuring a phase difference between a beat signal and one of (a) a phase reference signal, and (b) an additional beat signal, the beat signal obtained by a process comprising summing the first beatable signal and the second beatable signal, the additional beat signal obtained by a process comprising summing the first beatable signal and the phase reference signal, calculating the direction angle from the measured phase difference; and determining the bearing of the source location from the direction angle.

23. The method of claim 22, additionally comprising:

transmitting the phase reference signal from the source location; and receiving the phase reference signal at the receiving location.

24. The method of claim 22, additionally comprising:

generating respective instance of the phase reference signal at the source location and the receiving location; and determining a phase difference between a beat signal obtained from the first beatable signal as transmitted from the first position and the second beatable signal as transmitted from the second position and the instance of the phase reference signal generated at the source location.

25. A system for determining the bearing of a source location from a receiving location, the system comprising:

means for generating a phase reference signal;

at the source location, means for transmitting a first beatable signal and a second beatable signal from locations spatially offset from one another in a reference direction, the second beatable signal differing in frequency from the first beatable signal by a frequency difference, the first beatable signal and the second beatable signal collectively having a phase relationship with the phase reference signal; and at the receiving location, means for receiving the first beatable signal and the second beatable signal and for determining a direction angle, relative to the reference direction, of the source location from the receiver location, the determining comprising:

obtaining a beat signal, the obtaining comprising summing the first beatable signal and the second beatable signal, measuring a phase difference between the beat signal and one of (a) the phase reference signal and (b) an additional beat signal obtained by a process comprising summing the first beatable signal and the phase reference signal, and calculating the direction angle from the phase difference.

26. The system of claim 25, in which:

the system additionally comprises means for transmitting the phase reference signal from the source location; and the means for receiving is additionally for receiving the phase reference signal.

27. The system of claim 25, in which:

the means for generating the sourced reference signal comprises means for generating respective instances of the phase reference signal at the source location and the receiving location; and the means for determining additionally comprises means for determining a phase difference between a beat signal obtained from the first beatable signal and the second beatable signal as transmitted from the source location and the instance of the phase reference signal generated at the source location.

* * * * *